(12) United States Patent  
Swift et al.

(10) Patent No.: US 7,469,933 B2  
(45) Date of Patent: Dec. 30, 2008

(54) QUICK CONNECT COUPLING WITH DISCONNECT LOCK

(75) Inventors: Jonathan C. Swift, Cambridge (GB); Geoffrey R. Keast, Cambs (GB); Timothy G. Robinson, Denver, CO (US); Stephen McGee, St. Neots (GB)

(73) Assignee: The Gates Corporation, Denver, CO (US)

( * ) Notice: Subject to any disclaimer, the term of this patent is extended or adjusted under 35 U.S.C. 154(b) by 399 days.

(21) Appl. No.: 11/372,733

(22) Filed: Mar. 9, 2006

(65) Prior Publication Data

US 2006/0208484 A1 Sep. 21, 2006

Related U.S. Application Data

(60) Provisional application No. 60/660,971, filed on Mar. 11, 2005.

(51) Int. Cl.  
*F16L 55/00* (2006.01)

(52) U.S. Cl. .................. 285/86; 285/321; 285/314; 285/313

(58) Field of Classification Search ............. 285/321, 285/314, 315, 86, 83, 313; 29/890.14  
See application file for complete search history.

(56) References Cited

U.S. PATENT DOCUMENTS

| | | | | |
|---|---|---|---|---|
| 2,898,130 | A | * | 8/1959 | Hansen .................. 285/277 |
| 3,398,977 | A | * | 8/1968 | Yoneda .................. 285/45 |
| 3,439,944 | A | * | 4/1969 | Leutenegger ............ 285/321 |
| 3,773,360 | A | * | 11/1973 | Timbers ................ 285/307 |
| 4,240,654 | A | * | 12/1980 | Gladieux .............. 285/276 |
| 4,872,710 | A | * | 10/1989 | Konecny et al. ........ 285/81 |
| 4,934,742 | A | | 6/1990 | Williamson |
| 4,936,544 | A | | 6/1990 | Bartholomew |
| 5,076,616 | A | | 12/1991 | Williamson |
| 5,115,550 | A | | 5/1992 | Williamson |
| 5,197,769 | A | | 3/1993 | Williamson |
| 5,358,168 | A | | 10/1994 | Williamson |
| 5,437,483 | A | * | 8/1995 | Umezawa ............... 285/308 |
| 5,439,257 | A | | 8/1995 | Williamson |
| 5,516,156 | A | | 5/1996 | Williamson |
| 5,516,157 | A | | 5/1996 | Williamson |
| 5,533,764 | A | | 7/1996 | Williamson |
| 5,533,765 | A | | 7/1996 | Williamson et al. |
| 5,570,910 | A | * | 11/1996 | Highlen ............... 285/308 |

(Continued)

OTHER PUBLICATIONS

International Preliminary Report on Patentability on corresponding patent application PCT/US06/08621 dated Nov. 15, 2007, 7pages.

(Continued)

*Primary Examiner*—David E Bochna  
(74) *Attorney, Agent, or Firm*—Jerry L. Mahurin, Esq.; Jeffrey Thurnau, Esq.; Paul N. Dunlap, Esq.

(57) ABSTRACT

A coupling assembly is provided that generally includes a female coupling selectively interconnected to a male coupling to provide sealing engagement. In one embodiment, the female coupling and the male coupling are secured together by a mechanical locking mechanism that is disengaged with a release mechanism. To prevent inadvertent disengagement, a secondary locking device or spacer is provided which substantially prevents the release mechanism from disengaging the locking mechanism.

29 Claims, 34 Drawing Sheets

U.S. PATENT DOCUMENTS

| | | | |
|---|---|---|---|
| 5,934,709 A | | 8/1999 | Morrison |
| 6,065,779 A | * | 5/2000 | Moner et al. .................. 285/23 |
| 6,145,887 A | * | 11/2000 | Cambot-Courrau ............ 285/4 |
| 6,186,557 B1 | * | 2/2001 | Funk ........................... 285/39 |
| 6,305,721 B1 | * | 10/2001 | Heinrichs et al. ............. 285/23 |
| 6,530,604 B1 | | 3/2003 | Luft et al. |
| 6,554,320 B2 | * | 4/2003 | Cresswell .................... 285/39 |
| 6,592,151 B2 | * | 7/2003 | Densel et al. ................. 285/39 |
| 6,604,760 B2 | * | 8/2003 | Cresswell et al. ........... 285/305 |
| 6,637,781 B1 | | 10/2003 | Seymour |
| 6,688,655 B1 | * | 2/2004 | Watanabe ................... 285/321 |
| 6,964,435 B2 | * | 11/2005 | Wolf et al. .................... 285/39 |
| 6,969,093 B2 | * | 11/2005 | LeMay et al. ................. 285/86 |
| 6,983,959 B2 | * | 1/2006 | Wolf et al. ................... 285/314 |
| 7,029,035 B2 | * | 4/2006 | Seymour et al. ............ 285/308 |

OTHER PUBLICATIONS

Written Opinion of International Searching Authority on corresponding patent application PCT/US06/08621 dated Sep. 21, 2007, 6 pages.

International Search Report on corresponding patent application PCT/US06/08621 dated Sep. 21, 2007, 3 pages.

Swagelock "Quick-Connects" Catalog, Aug. 2005 (believed to be published as early as 1996), 12 pages.

* cited by examiner

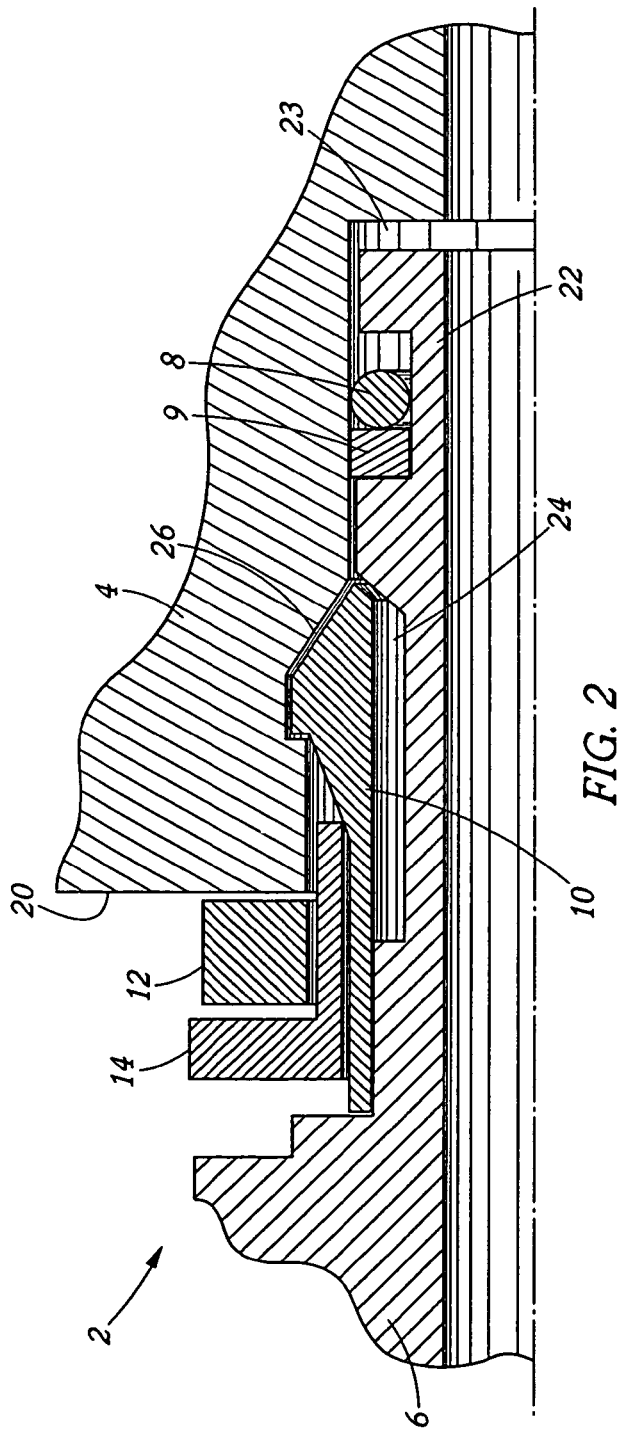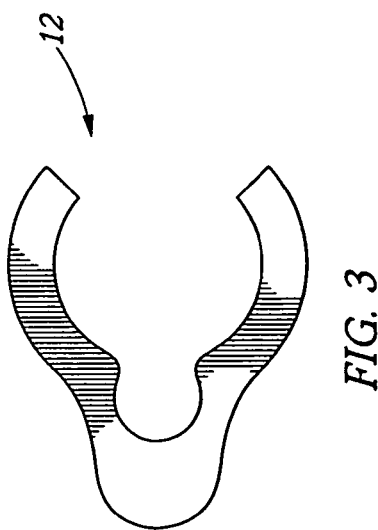
FIG. 2
FIG. 3

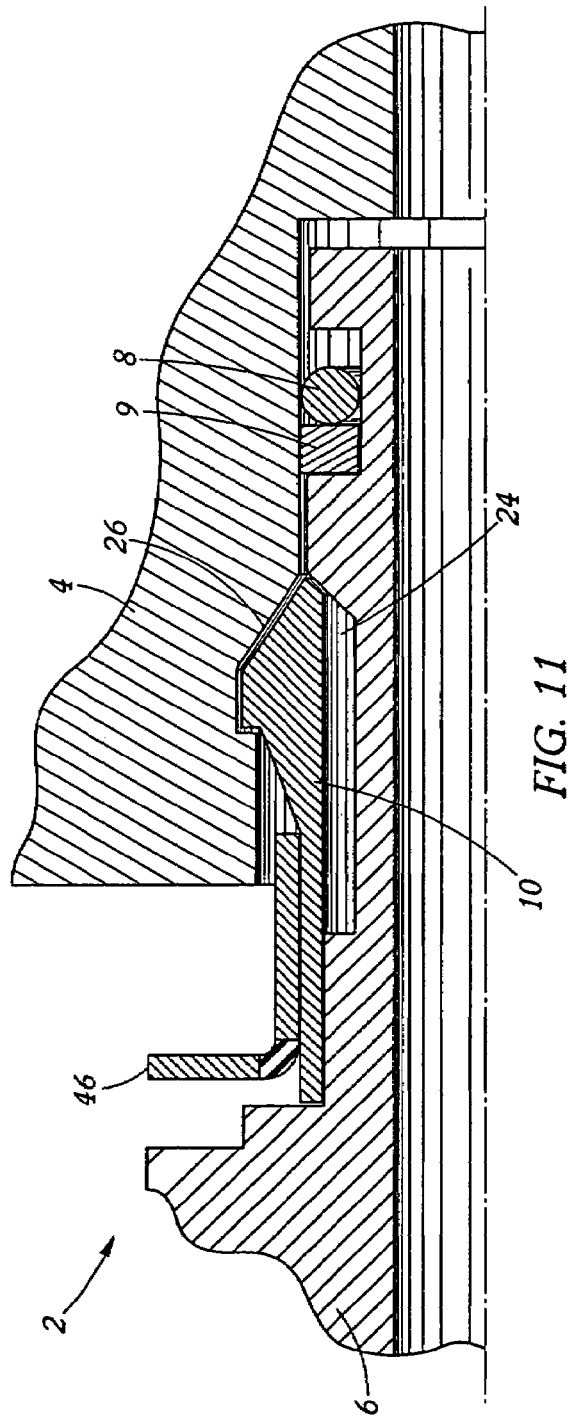
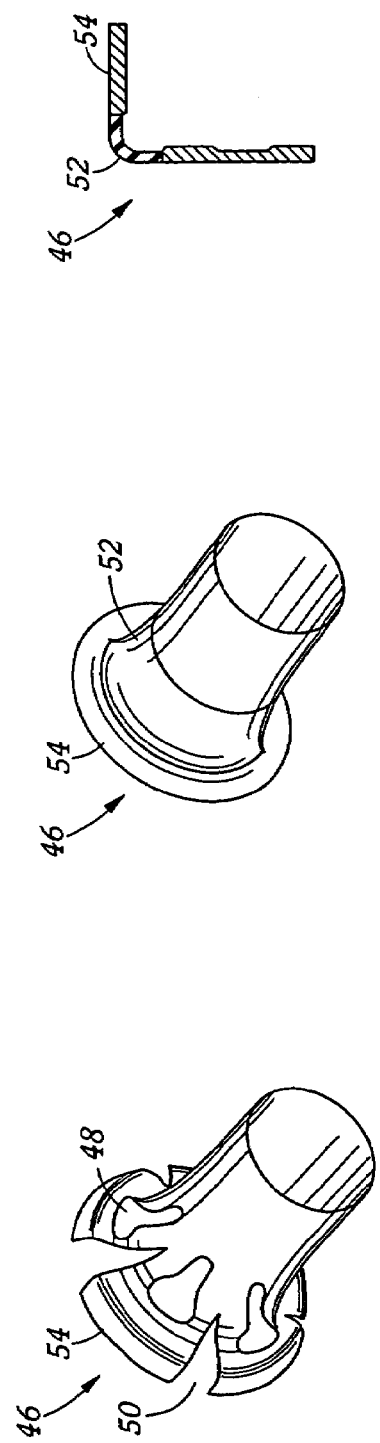
FIG. 11
FIG. 12
FIG. 13
FIG. 14

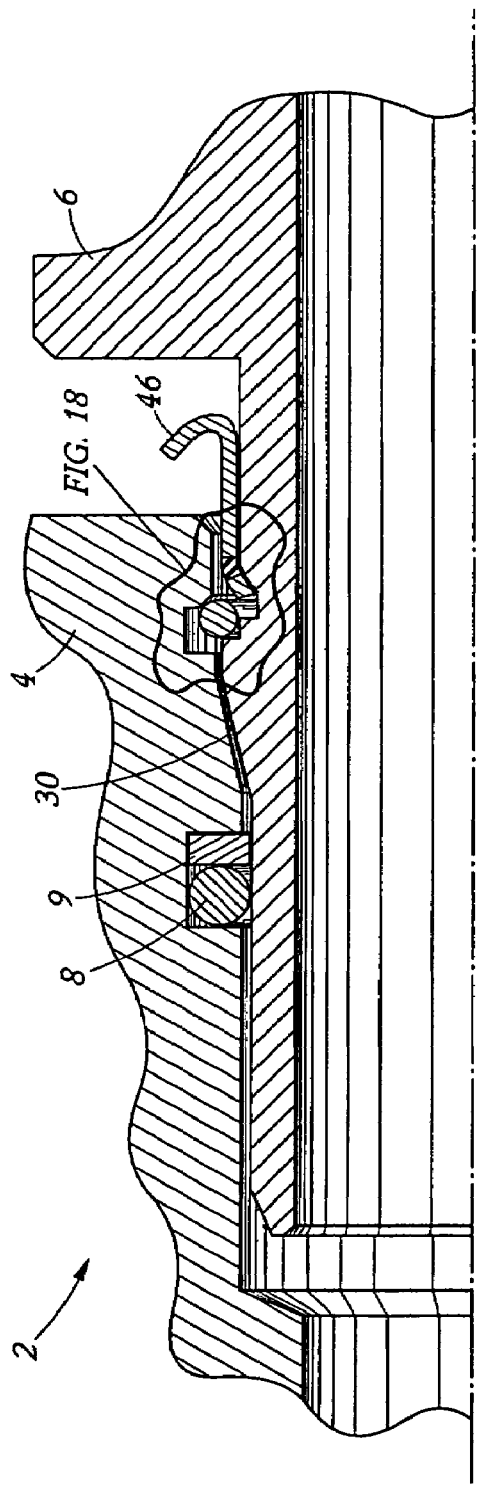
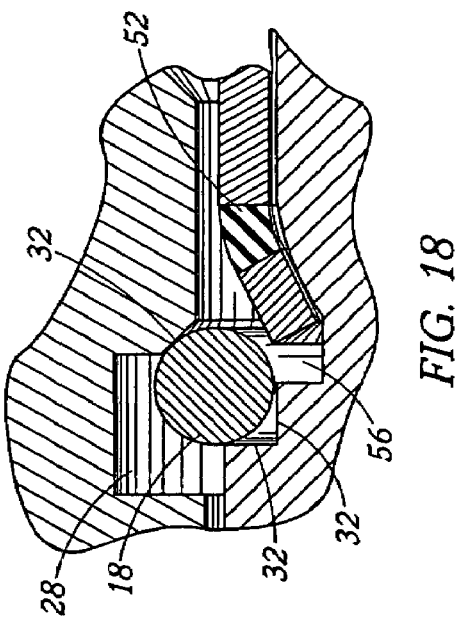
FIG. 17
FIG. 18

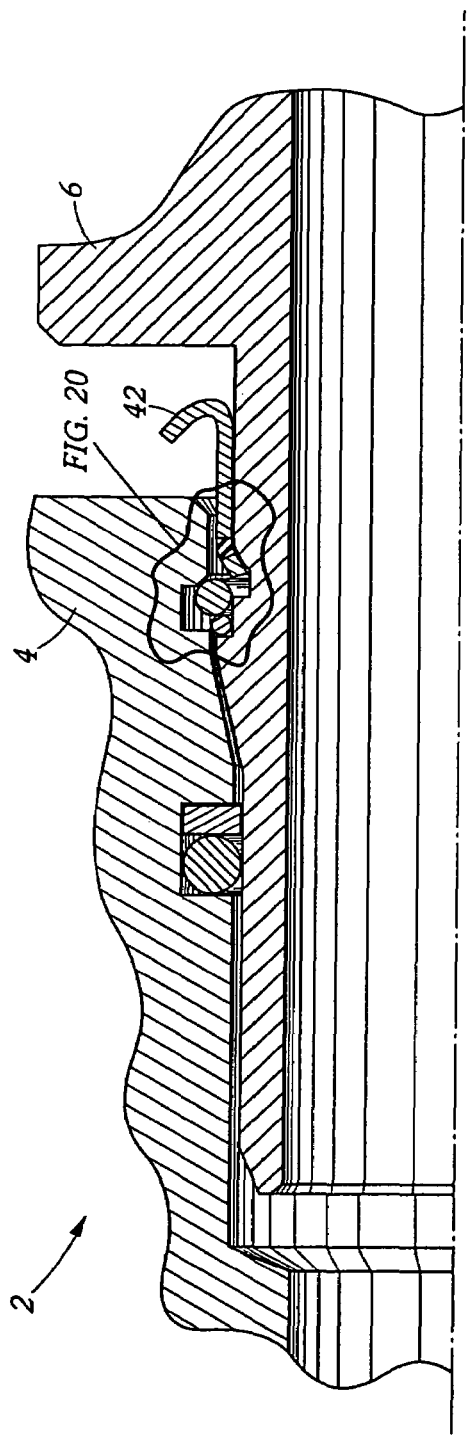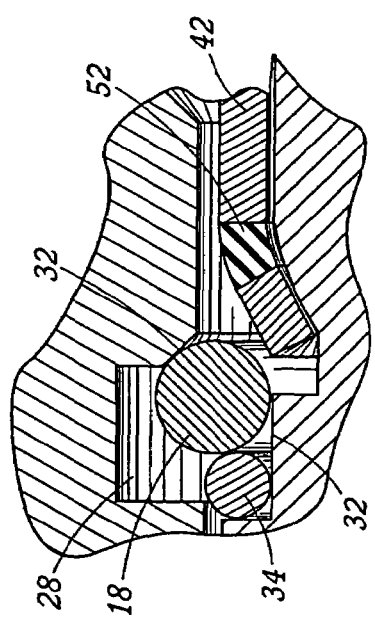

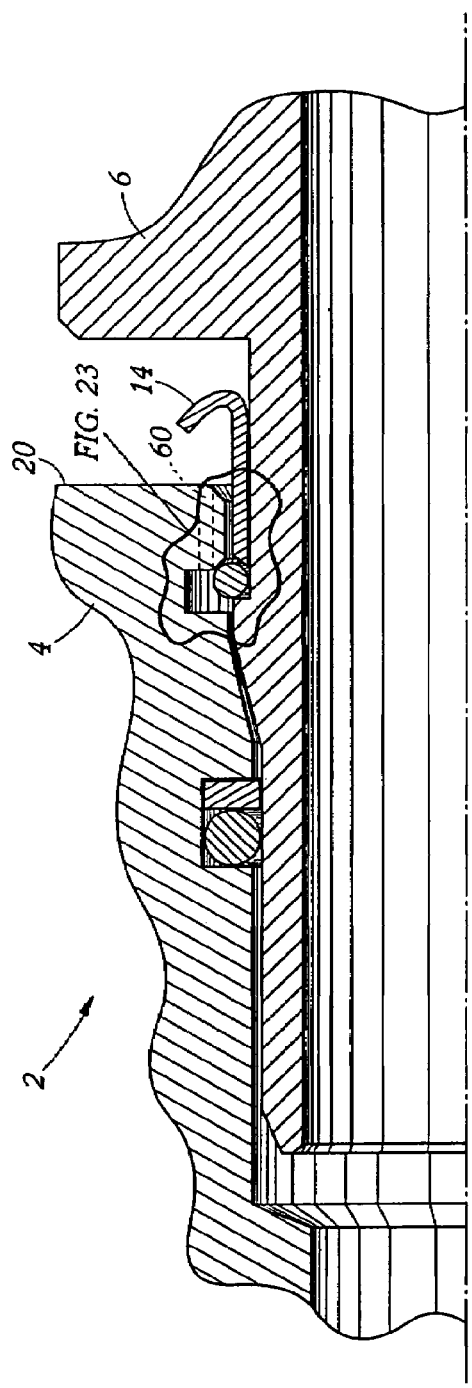
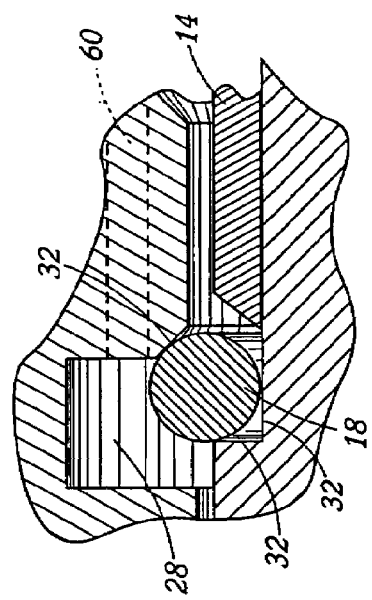
FIG. 22
FIG. 23

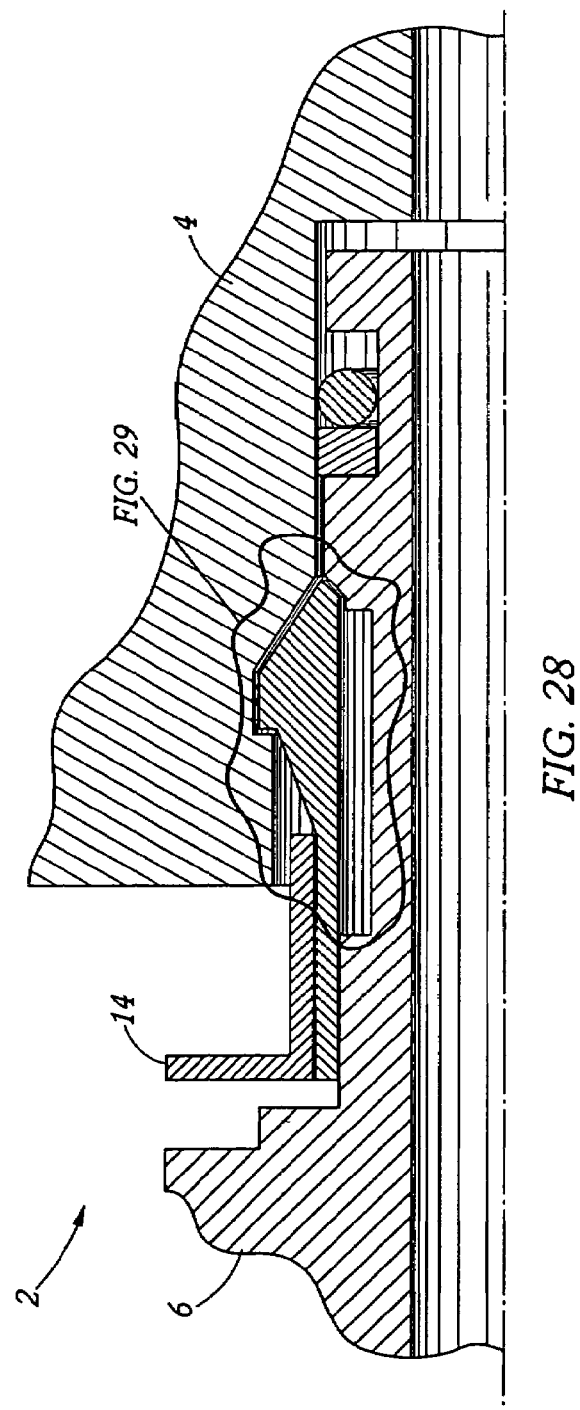
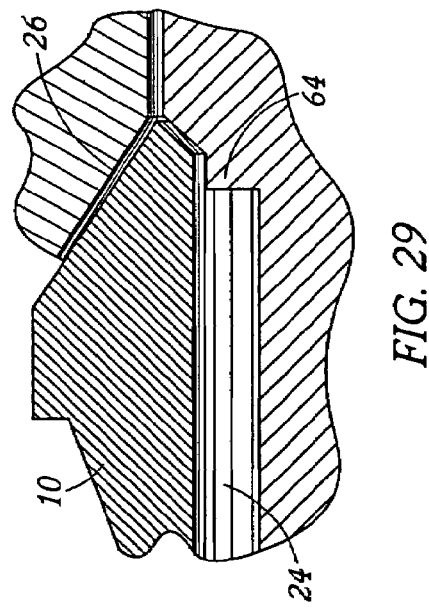

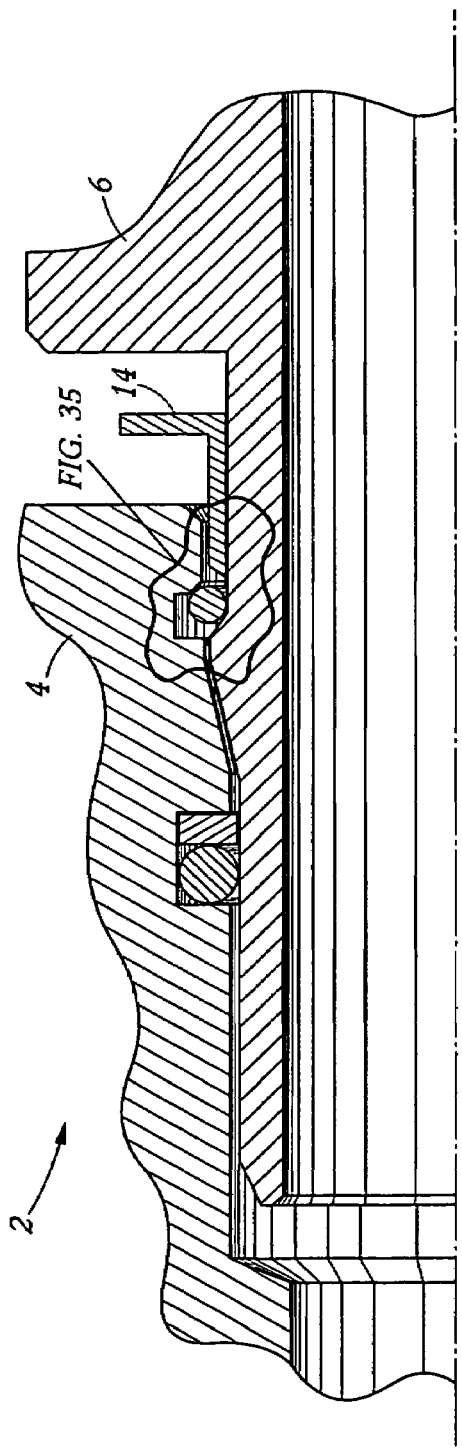
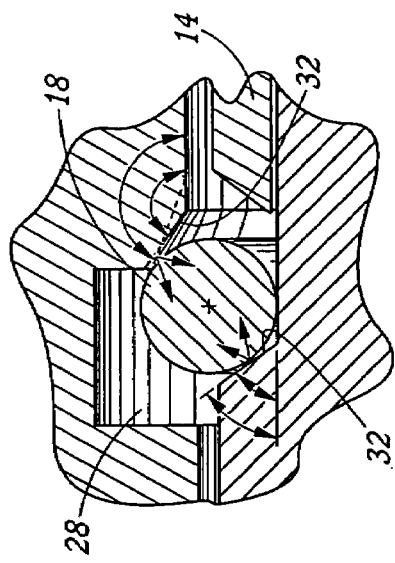
FIG. 34
FIG. 35

(PRESSURIZED)

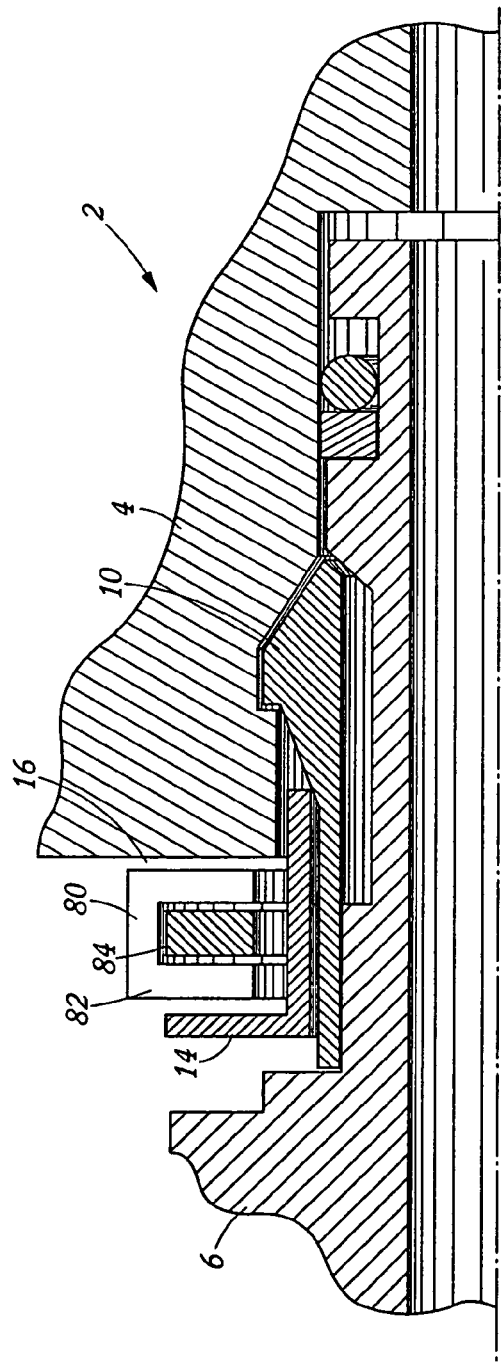
FIG. 44
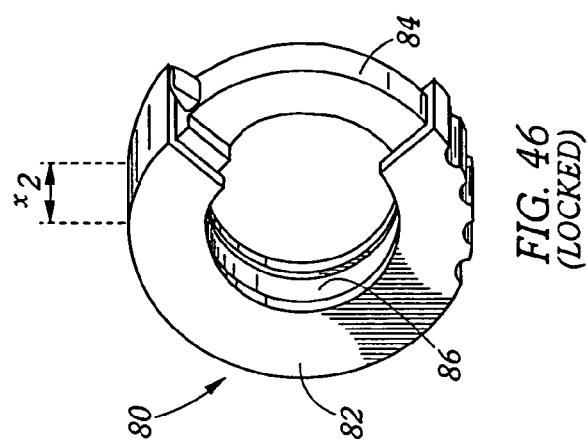
FIG. 45
(RELAXED)
FIG. 46
(LOCKED)

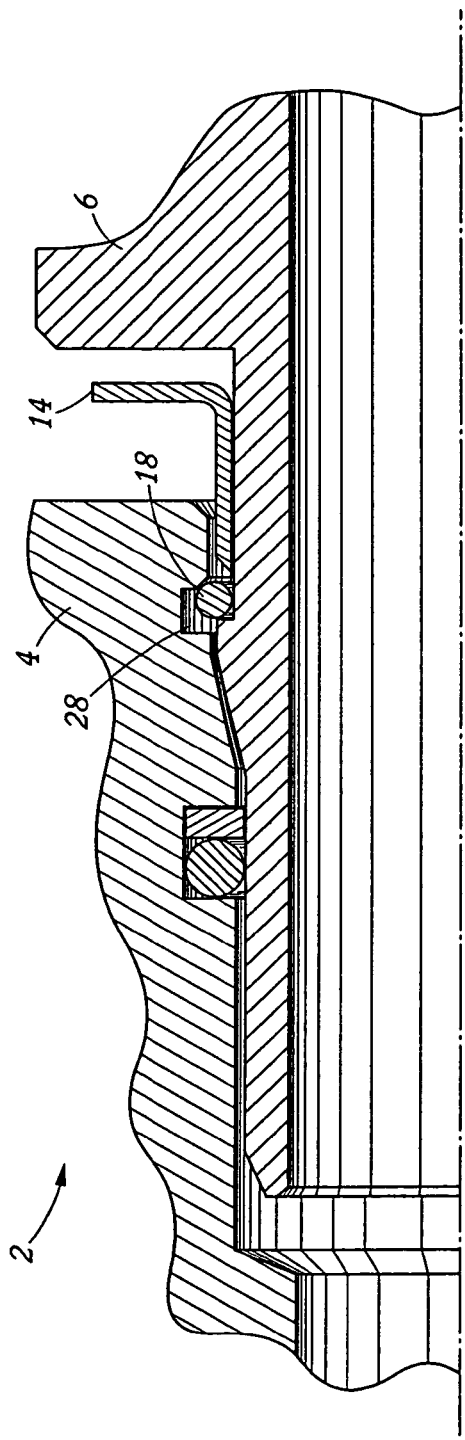
FIG. 49
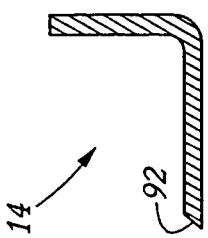
FIG. 52
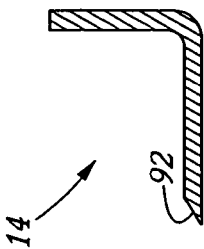
FIG. 53
FIG. 50
FIG. 51

QUICK CONNECT COUPLING WITH DISCONNECT LOCK

This application claims the benefit of U.S. provisional patent application 60/660,971, filed Mar. 11, 2005, which is incorporated by reference in its entirety herein.

FIELD OF THE INVENTION

The present invention relates generally to quick connect couplings that can be quickly connected and disconnected. One embodiment of the invention further comprises a removable safety mechanism that prevents the inadvertent disengagement of the quick connect coupling.

BACKGROUND OF THE INVENTION

Quick connect hydraulic and pneumatic couplings typically include a male portion in operable engagement with a female portion. The male and female portions may be interconnected to a hydraulic hose, tubing, piping, machinery or open apparatus that utilizes internal pressure. Since hydraulic hoses and interconnecting machinery often utilize high pressure fluids, safety and operational considerations are paramount since an inadvertent disconnection of the coupling may result in serious injury or system failure. Quick connect couplings are particularly desirable in locations that are not readily accessible since it often eliminates the need for engaging a threaded connection and the associated danger of cross threading.

It is also critical that quick connect couplings be designed for safe and reliable use. Obviously, one of the primary objectives is to provide a durable, leak-free connection. However, over time, increasing emphasis has been placed on safety. The quick connect characteristic of such couplings necessarily give rise to a greater risk of inadvertent and sudden disconnects, which may translate to catastrophic failure of the system or bodily injury. This is particularly evident in environments where use of such couplings is generally appealing. These include industrial or heavy machinery operations where installations of fluid connections are numerous, dense, and almost inaccessible. Unexpected impacts or continuous vibrational loads upon quick connect couplings during normal operations or maintenance may increase the likelihood of inadvertent disconnects. Further, inadvertent disconnects on pressurized systems can lead to damaged or broken machinery, destroyed premises, loss of mission, severe injuries and even death.

In general, the male portion of a quick connect coupling includes a hose insert portion and a ferrule that is attached to an open end of the hose. The ferrule is then compressed about the hose that is positioned around the hose insert causing it to be permanently affixed. Merely pressing a stem of the male portion into the female portion, or similarly configured port, subsequently completes a flow path for a liquid or gas, such as compressed air. Generally, the female portion, or port adapter, is threaded into place in a pre-assembly operation, or alternatively, it is machined directly into then associated fixture, machine, or equipment. Thus, it is easy to ensure that the port is properly sized to receive the male portion.

Quick connect couplings have numerous uses and applications in the home and in many industries, including aerospace, automotive, construction, farming, etc. Generally, where there is a need for continuous connection and subsequent disconnection of fluid or gas lines, or the location of the intended connection makes it difficult of impossible to access, such that a threaded interconnection would be infeasible, a quick connect is ideal.

Some quick connects are provided with a groove integrated into the male portion for the receipt of a locking device. Generally, the locking device is a snap ring that comprises a cylindrical member with an inner and outer diameter. The snap ring includes a gap such that it is capable of resilient deflection to form a ring of smaller or larger diameter. In some embodiments of the prior art, such as the QC series sold by Swagelok®, the snap ring is placed over a groove integrated into the outer diameter of the male portion. After insertion of the male portion into the female portion, a ring deflection mechanism or sleeve is forced over the snap ring, thereby deforming it into a groove located in the male portion to prevent disconnection. The sleeve is held in place over the snap ring by a spring mechanism. To disconnect the two components, the sleeve is pulled towards the spring, thus releasing the compressed snap ring from the groove and allowing the two portions to be disengaged.

Another example of a quick connect coupling may be found in U.S. Pat. No. 6,637,781 to Seymour, ("Seymour") which is incorporated by reference in its entirety herein. Seymour teaches a quick connect system that utilizes a male portion and a female portion that selectively interconnect. The male portion is adapted to receive a sealing device, such as an o-ring and a resiliently deflectable snap ring. Upon insertion of the male portion into the female portion, the snap ring will radially deflect and engage grooves in both portions to lock the system together. A spacer is positioned between bearing surfaces on each of the portions to prevent movement of the male portion with respect to the female portion. To disconnect the coupling, a user removes the spacer from the coupling, thus allowing the male portion to be inserted further into the female portion, and repositioning the snap ring on the stem of the male portion. Once the snap ring reaches a certain point on the stem, it deflects to its nominal shape, thus allowing the male portion to be removed from the female portion. However, the apparatus described in Seymour is still subject to inadvertent release once the spacer is removed if the male stem is inadvertently pushed inwardly into the female coupling.

Thus, there is a long felt need for a quick connect coupling that utilizes a mechanical lock that is selectively unlocked by a release mechanism. Further, there is a need to ensure that the release mechanism is ineffective unless pressure in the coupling is reduced, an obstruction is removed, a cam is rotated, or a release assembly is actuated. That is, it is desirable that a second mechanical or pneumatic event must be performed or occur before the primary release mechanism can be actuated and the coupling disconnected.

SUMMARY OF THE INVENTION

It is thus one aspect of the present invention to provide a coupling that generally includes a male portion and a female portion which are operably and selectively interconnected. The female portion generally interconnects to a fixed port, or adapter for engagement with a port, such as a commonly known hexhead fluid boss. The male portion interconnects generally to a flexible fluid line, and selectively interconnects with the female portion. One embodiment also includes a locking device such that the coupling cannot be disconnected until the locking device is disengaged. The present invention may generally be interconnected and disconnected without the need of tools, such as wrenches. In addition, the coupling decreases the chance of hose kinking because the coupled portions may generally be rotated with respect to each other while remaining connected.

One embodiment of the present invention includes a locking mechanism that resides around the male portion of the coupling. More specifically, the locking mechanism is generally a cylinder that includes two ends, wherein one end has at least one cut-out or circumferential groove integrated therein. The cut-out allows that end of the cylinder to resiliently deflect when a radial force is applied thereto to create a conical shape. To disengage the coupling, the locking device is radially deflected into a release groove integrated into the male portion of the coupling. The locking mechanism also includes a thickened wall adjacent to the edge that employs the cut-out(s). The thickened edge preferably engages a locking groove integrated into the female portion of the coupling when the lock is at its nominal position. Upon deflection of the locking device, the thicker portion is unseated from the locking groove of the female portion, thus facilitating removal of the two portions. The locking device is generally constructed of a resilient material, such as steel, aluminum, plastic, Teflon, etc. In addition, the locking device may be of various shapes to facilitate locking of the two portions, and may include a sloped surface wherein contact with the outside surface of the female portion during coupling will cause radial deflection of at least a portion of the locking device. More specifically, an angled surface may be included in the thicker portion of the locking device such that axial loads on the locking device generated by coupling are redirected radially, thus facilitating deflection of an end of the locking device to its smaller radius configuration.

It is another aspect of the present invention to provide a locking device as described above that includes a protrusion integrated in the thicker portion that engages a receiving groove in the female portion of the coupling. Upon insertion of the male portion into the female portion, the protrusion of the locking device encounters a lip of the locking groove, wherein further insertion provides an unobstructed path that allows the locking device to return to its nominal undeflected position with the receiving groove of the locking groove adjacent to the protrusion. Once pressure is introduced to the coupling, the male portion and the female portion will tend to separate, thus seating the protrusion inside the receiving groove. The two portions cannot be separated until the system pressure is reduced thereby allowing the male portion to be inserted further into the female portion such that the protrusion can clear the receiving groove when the locking device is deflected by the release mechanism.

It is yet another aspect of the present invention to provide a simplified locking device that employs a deformable snap ring for locking the female portion to the male portion of the coupling. In order to lock the portions together, a snap ring groove is provided in the female portion of the coupling and a ring expanding surface is provided on an outer diameter of the male portion of the coupling. To lock the two components together, the snap ring, which has a smaller diameter than the inner diameter of the female portion at the snap ring groove, is placed proximate to the snap ring groove. The male portion, which has an outer diameter that is less than the inner diameter of the female portion of the coupling, is inserted, wherein the tip thereof initially passes through the snap ring, thus positioning the snap ring therearound. As the male portion is inserted into the female portion, the snap ring encounters the spring expanding surface, thus expanding the ring to a larger diameter and seating it inside the snap ring groove. Further insertion of the male portion will engage the snap ring onto a male portion of the coupling that is a smaller diameter than the largest diameter of the ring expanding surface, thus allowing the snap rings to retract and engage the male portion of the coupling. The snap ring subsequently abuts against a snap ring bearing surface of the female portion and a snap ring bearing surface of the male portion. Upon pressurization of the system, the bearing surfaces tightly engage the snap ring, thereby preventing the two portions from being separated. In order to release the snap ring, it must be expanded to on unnaturally large diameter state, which is achieved by use of a release mechanism. The release mechanism in one embodiment deflects the snap ring into the snap ring groove such that the male portion can be unobstructively removed from the female portion.

It is still yet another aspect of the present invention to provide a device that prevents the actuation of the lock release mechanism. More specifically, one embodiment of the present invention includes an obstruction, spacer or other apparatus which operatively restricts the ability of the release mechanism to be actuated. For example, a spacer may be employed that resides between the release mechanism and the bearing surface of the female portion that prevents the release mechanism from engaging the locking device. Once the spacer is selectively removed or displaced from a certain position, the release mechanism may be freely actuated and the two portions of the coupling disconnected. Alternatively, the spacer cylinder or other apparatus may be rotated to permit engagement of the release mechanism with the locking device, or partially removed to allow sufficient travel of the release mechanism.

Similarly, other embodiments of the present invention employ a release tool that engages the release mechanism(s). The release tool may provide a torsional or axial force that is used to force the release mechanisms against the locking device to facilitate disconnection. Further, the release tools in some embodiments of the present invention are designed to be effective preferably when the internal pressure of the coupling is below a certain level. More specifically, release tools may employ force limiting aspects that ensure they cannot be actuated when the pressure inside the system is above a predetermined level. In addition, release tools may be designed to buckle or deflect such that no force above a predetermined magnitude can be transferred to the release mechanism to perform the required interaction with the locking device. In operation, the locking mechanism of one embodiment of the present invention will become firmly seated in the locking groove of the female portion of the coupling at the introduction of fluid pressure. The higher the pressure, the higher the axial force that drives the female portion away from the male portion. The higher the axial forces increase the amount of force needed to deflect the locking device or snap ring due to the proportional increase in bearing loads. Thus, embodiments of the present invention employ a release tool that acts as an intermediary between the user and the release mechanism, thereby limiting the force that can be applied to the release mechanism based on the pressure inside the coupling.

It is yet another aspect of the present invention to provide a device that substantially prevents the deflection of the locking device. For example, some embodiments of the present invention employ a collar that resides between the locking device and the release groove situated about the male portion of the coupling, such that the locking device cannot be deflected unless the restricting member is removed.

It is another aspect of the present invention is to employ a lock release assembly that resides around the release mechanism. More specifically, certain embodiments of the present invention may employ a cylindrical spring-loaded mechanism that includes a movable centerpiece or spacer that selectively obstructs the release mechanism. The release mechanism may is actuated in this embodiment of the present invention when the lock release assembly is altered to remove the obstruction. Once the release mechanism is placed in the locked position, the movable portion of the lock release assembly or spacer is positioned to substantially prevent movement of the release mechanism.

It is still yet another aspect of the present invention to provide a lock release mechanism that is cam actuated. More specifically, a cam is utilized which resides around a portion of a male portion of the coupling that envelopes the lock release mechanism. The lock release mechanism of one embodiment of the present invention includes a flange around a cylindrical body. The flange may be designed to employ a singular thin protrusion that does not span around the entire circumference of the generally cylindrical release mechanism. The protrusion resides in a channel of the cam such that rotation of the cam transitions the release mechanism into the coupling to force the locking device into its unlocked position. One skilled in the art will appreciate that the cam may be free to rotate or be threadingly engaged on the male portion without departing from the scope of the invention.

It is still yet another aspect of the present invention to provide a coupling that includes a secondary locking device. More specifically, one embodiment of the present invention includes a secondary locking device that is generally used in quick connects of the art as described above. One secondary locking device that may be employed is a pressure actuated lock that includes a snap ring that deforms into a locking groove when pressure is introduced to the system. A combination of a primary lock based on mechanical connections, and a secondary lock based on pneumatic pressure ensures the system will not disconnect even when the coupling is unpressurized.

It is yet another aspect of the present invention to provide a coupling that is constructed of commonly known materials. More specifically, the locking device and/or snap ring of one embodiment of the present invention is a resiliently deflectable material which is comprised of steel, aluminum, silicone, plastic, fiberglass or combinations thereof or other similar material well known in the art.

The Summary of the Invention is neither intended nor should be construed as being representative of the full extent and scope of the present invention. The present invention is set forth in various levels of detail in the Summary of the Invention as well as in the attached drawings and the Detailed Description and no limitation as to the scope of the present invention is intended by either the inclusion or exclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

FIG. 2 is a cross-sectional front elevation view of a locking device of one embodiment of the present invention;

FIG. 3 is a front elevation view of a spacer utilized in the embodiment shown in FIG. 2;

FIG. 11 is a cross-sectional front elevation view of another embodiment of the present invention that employs a release mechanism;

FIG. 12 is a perspective view of a release mechanism that utilizes a plurality of apertures;

FIG. 13 is a release mechanism that utilizes a webbing configuration;

FIG. 14 is a cross-sectional view of the embodiment shown in FIG. 13;

FIG. 17 is a cross-sectional front elevation view of another embodiment of the present invention that utilizes a release mechanism;

FIG. 18 is a detailed view of the embodiment shown in FIG. 17 that shows deflection of the release mechanism;

FIG. 19 is a cross-sectional front elevation view of another embodiment of the present invention similar to that shown in FIG. 17 and which utilizes a snap ring;

FIG. 20 is a detailed view of the embodiment shown in FIG. 19;

FIG. 22 is a cross-sectional front elevation view of another embodiment of the present invention that utilizes a release mechanism that prevents the snap ring from inadvertently unlocking;

FIG. 23 is a detailed view of the embodiment shown in FIG. 22;

FIG. 28 is a cross-sectional front elevation view of another embodiment of the present invention that employs a stop integrated into the lock release groove of the male portion of the coupling which substantially prevents the lock from inadvertently becoming disengaged;

FIG. 29 is a detailed view of the embodiment shown in FIG. 28;

FIG. 34 is a partial cross-sectional front elevation view of an alternative embodiment of the present invention;

FIG. 35 is a detailed view of the embodiment shown in FIG. 34 which depicts the interaction of forces imparted upon the snap ring when the coupling is pressurized;

FIG. 44 is a partial cross-sectional front elevation view of an alternative embodiment of the present invention that employs a lock release assembly;

FIG. 45 is a perspective view of the lock release assembly of the embodiment of FIG. 44 in a relaxed position;

FIG. 46 is a perspective view of the lock release assembly of FIG. 45 shown in a locked position that prevents the actuation of the release mechanism;

FIG. 49 is a partial cross-sectional front elevation view of an another embodiment of the present invention that employs a release mechanism;

FIG. 50 is a cross-sectional view of a lock release mechanism with a shallow beveled engagement surface;

FIG. 51 is a lock release mechanism similar to that of FIG. 50, and shown with a vertical engagement surface;

FIG. 52 is a lock release mechanism similar to that shown in FIG. 50, with a steep angled engagement surface;

FIG. 53 is a lock release mechanism similar to that shown in FIG. 50 with a reversed angled engagement surface;

Figure 1:
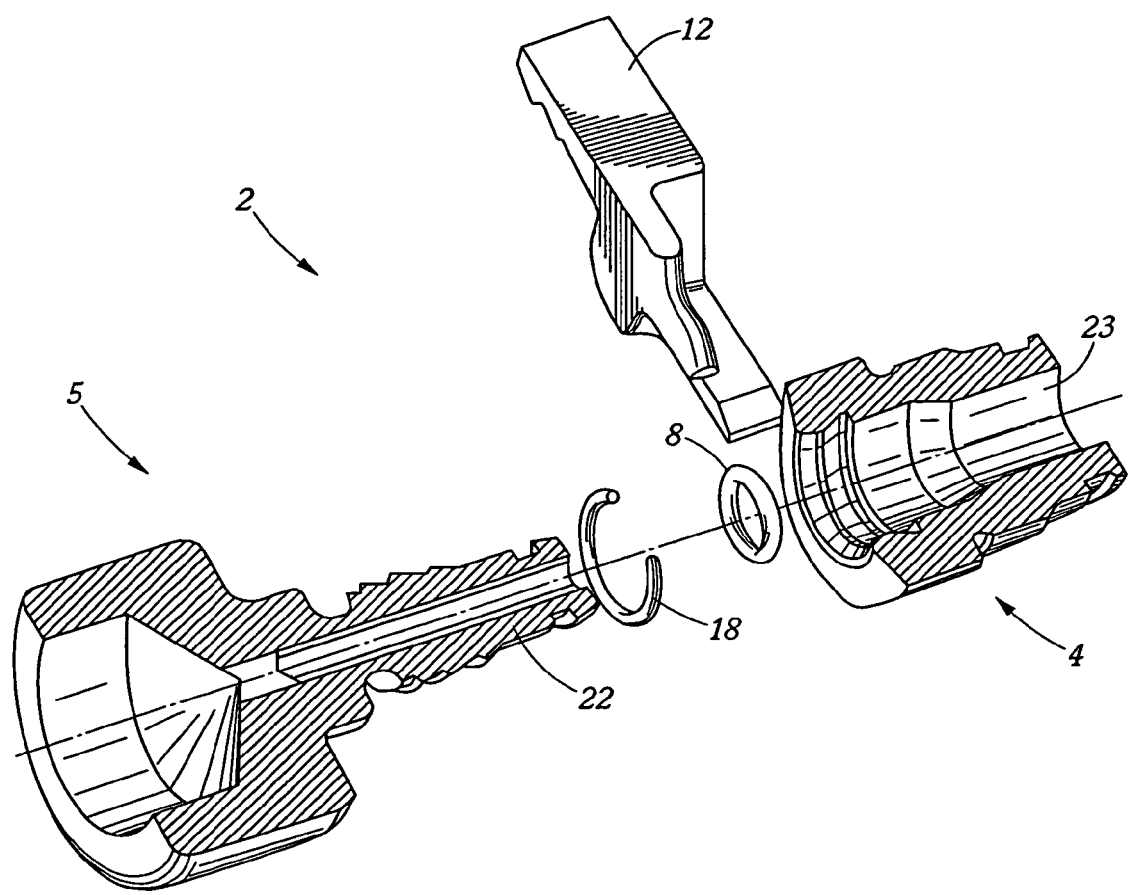
FIG. 1 is an exploded sectional perspective view of a prior art quick connect with a locking mechanism.

To assist in the understanding of the present invention the following list of components and associated numbering found in the drawings is provided herein:

| # | Component |
|---|---|
| 2 | Coupling |
| 4 | Female portion |
| 6 | Male portion |
| 8 | Seal |
| 9 | Washer |
| 10 | Locking device |
| 12 | Spacer |
| 14 | Release mechanism |
| 18 | Snap ring |
| 20 | Adapter port face |
| 22 | Stem |
| 23 | Port adapter |
| 24 | Release groove |
| 26 | Locking groove |
| 28 | Snap ring groove |
| 30 | Ring expanding surface |
| 32 | Snap ring bearing surface |
| 34 | Auxiliary ring |
| 36 | Release tool |
| 38 | Pivot point |
| 40 | Release mechanism contact surface |
| 42 | Hinge |
| 44 | Tab |
| 46 | Force-limited release mechanism |
| 48 | Aperture |
| 50 | Groove |
| 52 | Webbing |
| 54 | Contact surface |
| 56 | Diversion groove |
| 58 | Restricting mechanism |
| 60 | Channel |
| 62 | Receiving groove |

-continued

| # | Component |
|---|---|
| 64 | Stop |
| 66 | Protrusion |
| 68 | Sloped surface |
| 70 | Beveled edge |
| 72 | Slope angle |
| 80 | Lock release assembly |
| 82 | Outer cylinder |
| 84 | Inner cylinder |
| 86 | Gap |
| 90 | Release mechanism engagement surface |
| 92 | Lock release tip angle |
| 100 | Cam |
| 102 | Cam track |
| 104 | Obstructing sleeve half |
| 106 | Obstructing sleeve half (Large) |

It should be understood that the drawings are not necessarily to scale. In certain instances, details that are not necessary for the understanding of the invention or that render the other details difficult to perceive may have been omitted. It should be understood, of course, that the invention is not limited to the particular embodiments illustrated herein.

DETAILED DESCRIPTION

Referring now to FIG. 1, an example of a prior art quick connect coupling 2 is shown. More specifically, hydraulic and pneumatic quick connect coupling 2 generally includes a female portion 4 that is a cylindrical shaped member with an inner diameter and an outer diameter such that liquids and/or gases may pass freely therethrough. Quick connects also include a male portion 6 for operable engagement with the female portion 4. The male portion 6 generally has at least one groove where at least one seal 8 may be interconnected. The inner diameter of the male portion 6 is generally less than the inner diameter of the female portion 4 of the coupling to allow selective engagement and disengagement. In order to maintain the integrity of the quick connect coupling 2, a space 12 may be used to prevent unwanted deflection of the male portion 6 into the female portion 4. More specifically, once a locking snap ring 18 is deformed, it engages a cavity in the female portion 4, thus preventing disconnection of the two portions of the coupling 2. Further insertion of the male portion 6 causes the snap ring 18 to return to its nominal shape, thereby allowing disengagement of the male and female portions. However, after disconnection the snap ring will remain in the female portion 6 wherein it must be removed and re-engaged onto the male portion 4 prior to reuse. Thus, the snap ring 12 may become lost or wedged in the female portion 6 which increases difficulty in connecting and disconnecting the coupling 3.

Referring now to FIGS. 2-5, one embodiment of the present invention that utilizes a release mechanism 14 is provided. More specifically, one embodiment of the present invention employs a release mechanism 14 that interfaces with the locking device 10 that is seated in a locking groove 26 of the female portion 4 of the coupling. The locking device 10 may be a collar that resides about the male portion 6 of the coupling 2 or alternatively be a snap ring 18 that prevents the male portion 6 and female portion 4 from being disconnected. The release mechanism 14 of these embodiments of the present invention engages the locking device 10 or snap ring 18, thereby displacing it such that the male portion 6 and female portion 4 of the coupling may be disconnected. In addition, a spacer 12 is provided that resides between the release mechanism 14 and an adapter port face 20 on the female portion 4, such that the release mechanism 14 is substantially immobilized, thus ensuring that the coupled portions remain connected and providing an additional level of safety, especially when the coupling is used in high pressure applications.

Referring now to FIG. 2, one aspect of the present invention is provided that employs a novel locking device 10 which substantially prevents inadvertent disengagement of the male portion 6 and female portion 4. More specifically, one embodiment of the present invention employs a collar, cylinder or ring that resides around all or a portion of the stem 22 of the male portion 6 of the coupling 2. The locking device 10 includes a thickened area that is adapted for engagement with the locking groove 26 of the female portion 4 of the coupling 2. During connection of the two portions, the adaptor port face 20 of the female portion 4 contacts a sloped surface of the locking device 10, thereby displacing it radially into a release groove 24 machined into the stem 22 of the male portion 6. As insertion continues, the locking device 10 will encounter the locking groove 26, wherein the locking device will expand to its nominal shape. Once seated in the locking groove 26, the locking device 10 prevents inadvertent disconnection of the two portions without deflecting the locking device 10 into the release groove 24 to provide an obstruction free path.

To disconnect a locked coupling, the release mechanism 14 is utilized. The release mechanism is designed to deflect the locking device 10 into the release groove 24 of the male portion 6. As shown herein, the release mechanism 14 in one embodiment comprises a cylindrical collar that resides circumferentially around the locking device 10, and includes a flange for the engagement with a user's finger or tool that facilitates the movement of the mechanism. When the release mechanism 14 is moved inwardly as shown, it contacts the sloped surface of the locking device 10 thereby redirecting the axial applied force into a radial force that deflects one end of the locking device 10 into the release groove 24 to provide an obstruction free path and allow disconnection of the male portion 6 and female portion 4.

In order to prevent unwanted or accidental disconnections of the coupling, a safety device such as a spacer, cylinder, or ring 12 may be provided that prevents the release mechanism 14 from transitioning into the unlocked position. The spacer 12 may be a removable ring that is situated between the flange of the release mechanism 14 and the adaptor port face 20 of the female portion 4. Thus, one embodiment of the present invention requires the manual removal or rotation of the spacer or cylinder 12 before the release mechanism 14 can be actuated. One of ordinary skill in the art will appreciate that other release mechanism obstruction devices may be employed without departing from the scope of the invention. For example, a housing, (not shown) that contains a selectively deployable spacer may be utilized as taught by U.S. Pat. No. 6,637,781 to Seymour. Alternatively, safety mechanisms 12 and assemblies which are designed for rotation to permit the release mechanism to travel are shown in FIGS. 44-46 and 55-57 45-47 and 57-58.

Referring now to FIG. 3, one embodiment of a spacer 12 of the present invention is provided herein. More specifically, the spacer 12 may consist of a ring that is designed to engage the male portion of the coupling between the release mechanism and the adapter port face. Removal of the spacer 12 provides an obstruction free path wherein the release mechanism may be transitioned to unseat the locking device.

Figure 4:
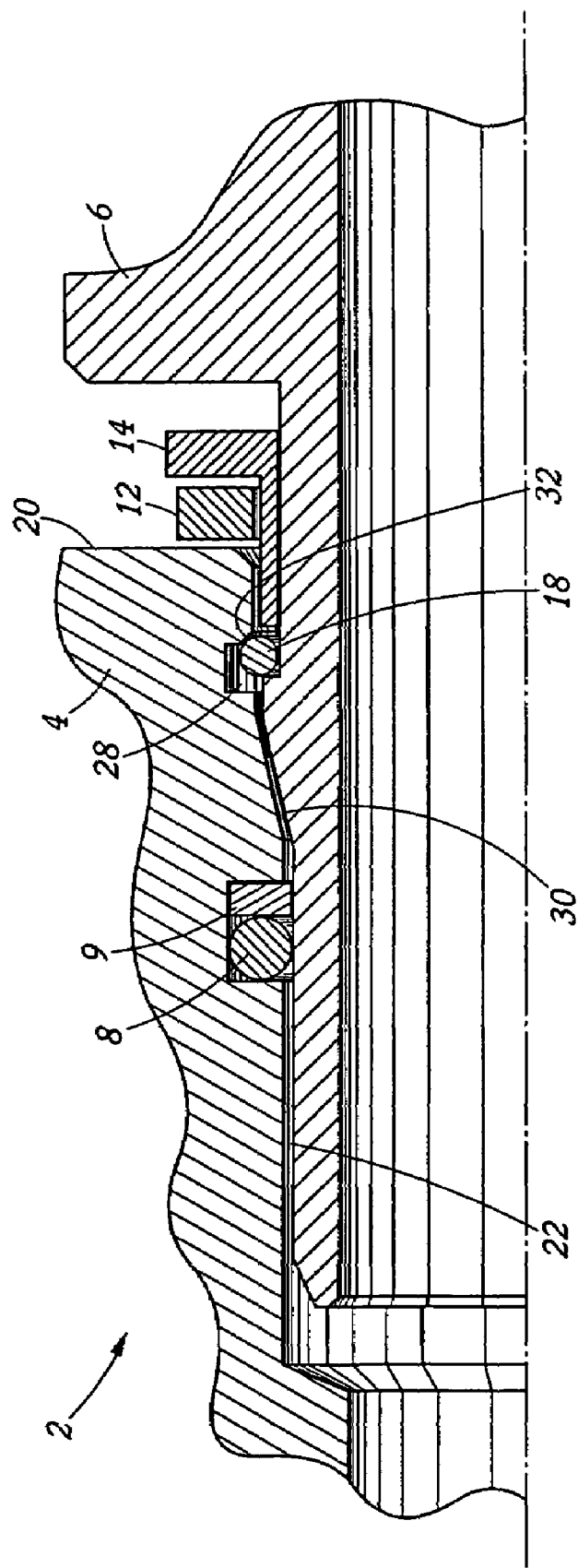
FIG. 4 is a cross-sectional front elevation view of another embodiment of the present invention, and which utilizes a snap ring.

Referring now to FIG. 4, an alternative embodiment of the present invention that utilizes a snap ring 18 is provided. More specifically, this embodiment of the present invention is similar to that shown in FIG. 2, although the release mechanism 14 interacts with a snap ring 18 that performs the locking function. In order to lock the male portion 6 and female portion 4 together, the snap ring 18 is placed adjacent to a snap ring groove 28 in the female portion 4 of the coupling 2. The snap ring 18 is generally a discontinuous ring capable of resilient deflection between a first and a second diameter. As shown herein, the snap ring 10 has a smaller diameter in its nominal position. When inserting the male portion 6 into the female portion 4, the snap ring 18 will abut the outer diameter of the stem 22. As insertion continues, the snap ring 18 will be expanded by a ring expanding surface 30 situated about the outer surface of the stem 22, thus expanding the snap ring 18 into the snap ring groove 28. Upon further insertion, the outer diameter of the male portion 6 decreases such that the snap ring 18 will contract around the stem 22 and engage bearing surfaces 32 on the male and female portions, thereby preventing disengagement of the male portion 6 and female portion 4 of the coupling 2.

The release mechanism 14 is used to engage the snap ring 18, and expand the snap ring 18 into the snap ring groove 23 to allow the male portion 6 to be disconnected from the female portion 4. Again, a spacer 12 may be provided such that the release mechanism 14 cannot be sufficiently displaced to engage the snap ring 18.

Figure 5:
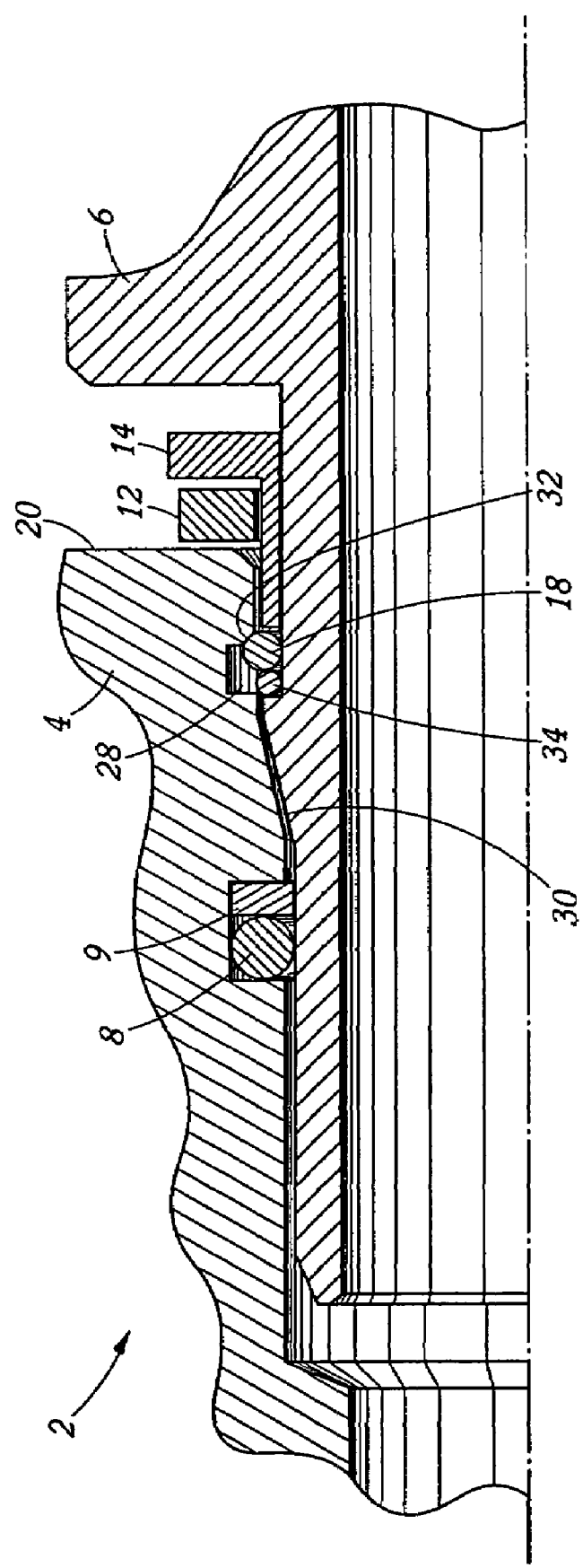
FIG. 5 is a cross-sectional front elevation view of an another embodiment of the present invention, and similar to that shown in FIG. 4.

Referring now to FIG. 5, an alternative embodiment of the present invention is provided that is similar to the embodiment shown in FIG. 4. Again, a snap ring 18 is used that is selectively expanded by a ring expansion surface 30 upon insertion of the male portion 6 into the female portion 4. As the snap ring 18 expands into the snap ring groove 28, it also rides on an auxiliary ring 34. Auxiliary ring 34 provides a hardened wear surface protecting the material of male portion 6. Once the male portion 6 is inserted a predetermined depth into the female portion 4 of the coupling 2, the snap ring 18 will contract about a reduced diameter area of the stem 22, thereby engaging it to the auxiliary ring 34 and a bearing surface 32 to lock the two portions together. The release mechanism 14 contacts the snap ring 18 to force it against the auxiliary ring 34 that expands the snap ring 10 into the snap ring groove 23, thereby allowing the two portions to be disconnected. A spacer 12 is provided such that movements of the release mechanism 14 are substantially prohibited until the spacer 12 or other similar obstruction is removed or rotated to allow sufficient travel of the release mechanism 14.

Referring now to FIGS. 6-20, another embodiment of the present invention is provided that employs a safety release mechanism 36 that prevents deflection of the release mechanism 14 when the coupling 2 is exposed to a predetermined pressure. More specifically, one embodiment of the present invention utilizes a release mechanism 14 that is incapable of providing a force beyond a predetermined level. When the coupling 2 is exposed to internal pressure, the male portion 6 and the female portion 4 will tend to separate. The internal pressure will cause the male portion 6 and/or female portion 4 to impart a bearing load on the locking device 10 or snap ring 18 wherein the greater the pressure, the greater the bearing load and vice versa. Accordingly, the release mechanism 14 of one embodiment is designed such that it imparts a predetermined load on the locking device 10 before built-in safety features prevent further interactions with the locking device 10 or snap ring 18. That is, to ensure the coupling remains interconnected at a given pressure, the load imparted on the locking device by the release mechanism 14 is such that it is unable to counteract the bearing load to unseat the locking device 10 or snap ring 18. Alternatively, a secondary tool 36 or other form of safety release mechanism may be provided that interacts with the release mechanism such that the load imparted thereon that affects the operation of the release mechanism 14 may be limited to a predetermined level to prevent inadvertent release. Thus, the amount of load imparted on the locking device 14 and/or snap ring 18 is limited such that the coupling 2 cannot be disconnected unless the pressure flowing therethrough is reduced to a predetermined level.

It is important to note that the increase in force required to activate the release mechanism 14 when system pressure is present may be small and indistinguishable to the operator. More specifically, the force required to actuate the release mechanism may be such that the force-limited release mechanism 46 is not required to uncouple the system. However, some situations dictate that an intermediate tool be provided between the operator and the release mechanism 14 to prevent decoupling even at low pressures.

Figure 6:
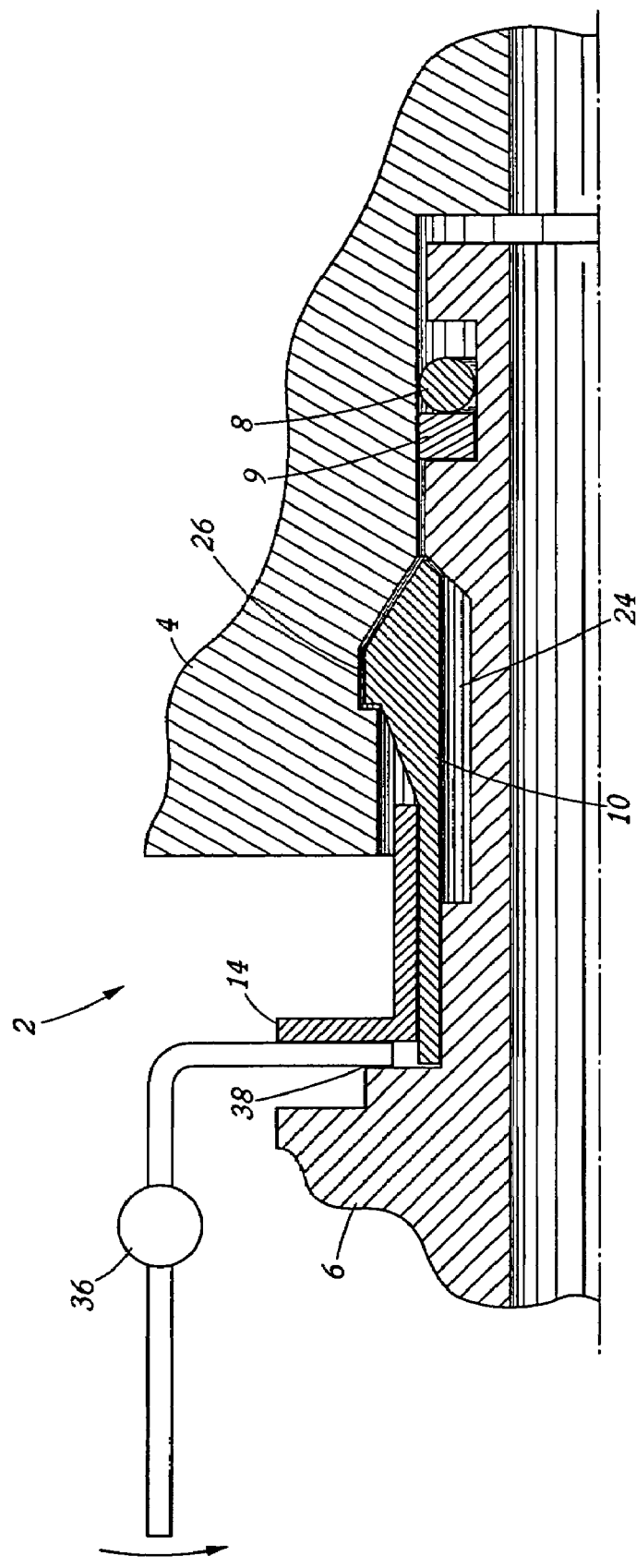
FIG. 6 is a cross-sectional front elevation view of an another embodiment of the present invention, and which employs a release tool to facilitate disconnection.

Referring now to FIG. 6, one embodiment of the present invention that employs the release tool 36 is shown. This embodiment of the present invention utilizes a tool 36 that selectively engages the release mechanism 14. Upon use of the release tool 36, in a direction generally perpendicular to the axis of the coupling 20, the release tool 36 will rotate about a pivot point 38 and interact with the release mechanism 14, to force the release mechanism 14 into engagement with the locking device 10. When the coupling 2 is exposed to internal pressure, the walls of the locking groove 26 will interact with the thicker area of the locking device 10 to create a bearing load therebetween. The greater the bearing load, the greater the frictional force between the locking device 10 and the wall of the locking groove 26 that must be counteracted. Thus, the release mechanism 14 must generate more radial force to overcome this frictional force and displace the locking device 10 into the release groove 24 to enable the coupling 2 to be disconnected.

As shown herein, the release tool 36 is a lever that pivots about the pivot point 38 situated on the male portion 6 of the coupling 2. When pivoted, the tool 36 forces the release mechanism 14 into the coupling to facilitate a disconnection. Preferably, the release tool 36 is equipped with a safety feature 36 that prevents the application of a force over a predetermined level, thereby limiting the amount of force the release mechanism 14 imparts on the locking device 10, and hence preventing disengagement of the coupling 2 while it is under pressure. One skilled in the art will appreciate that the force limiting aspects of the release tool 36 may be specifically tailored depending on the expected internal pressure encountered by the coupling 2. For example, at a given pressure, such as 5 psi, the release tool 36 may be designed to buckle, shear, or bind, wherein no additional force may be imparted on the release mechanism 14. Once the internal pressure is decreased, the release tool 36 will facilitate disconnection of the coupling 2.

Figure 7:
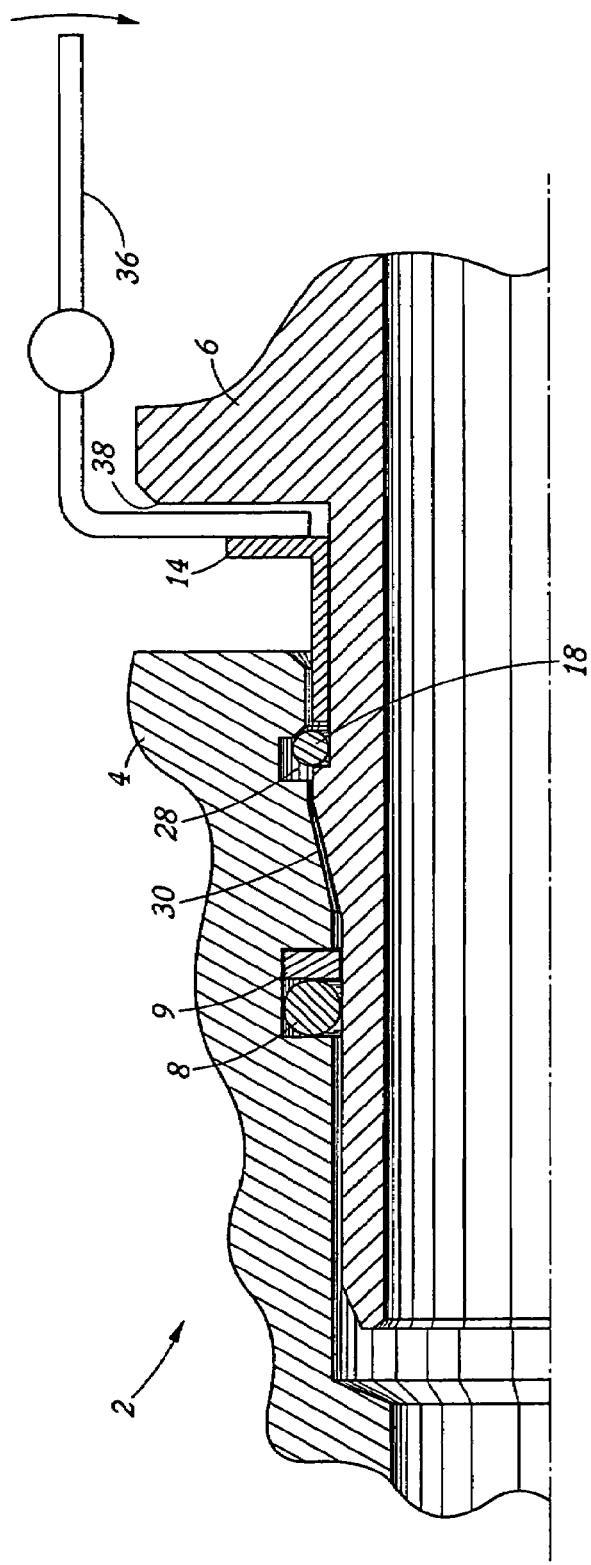
FIG. 7 is a cross-sectional front elevation view of an another embodiment of the present invention similar to that shown in FIG. 6, and which utilizes a snap ring.

Referring now to FIG. 7, an alternative embodiment of the present invention, similar to that shown in FIG. 6, is provided. More specifically, instead of the locking device, a snap ring 18 is employed. This embodiment of the present invention is similar to that shown above, wherein the release tool 36 rotates about the pivot point 38 situated on the male portion 6 and interacts with the release mechanism 14. Again, if the internal pressure of the coupling is above a certain level, the release tool 36 is designed to buckle, bend, or otherwise fail to prevent disconnection of the coupling 2.

Figure 8:
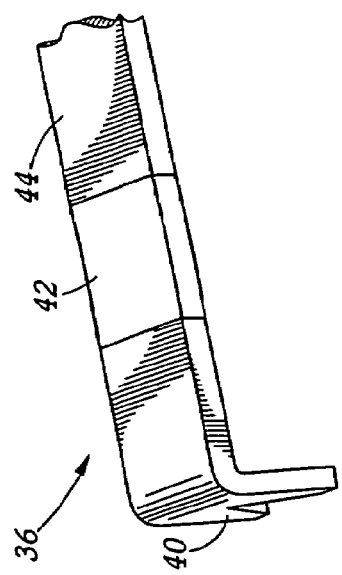
FIG. 8 is perspective view of a release tool of one embodiment of the present invention.

Referring now to FIG. 8, the release tool 36 of one embodiment of the present invention is shown. More specifically, the release mechanism 36 maybe an angled bar, or the like, that includes a release mechanism contact surface 40, a hinge 42, and a tab 44 for interaction with the user's hand or finger. The hinge 42 may be made of a resilient material with material properties that allow the tab 44 to deflect when the release tool 36 is engaged onto the release mechanism when the pressure inside the coupling is above a predetermined level. The hinge 42 may be formed of a plurality of grooves or a thinned area machined into the parent material such that the tool 36 has a localized weakened area that is capable of deflection.

Figure 9:
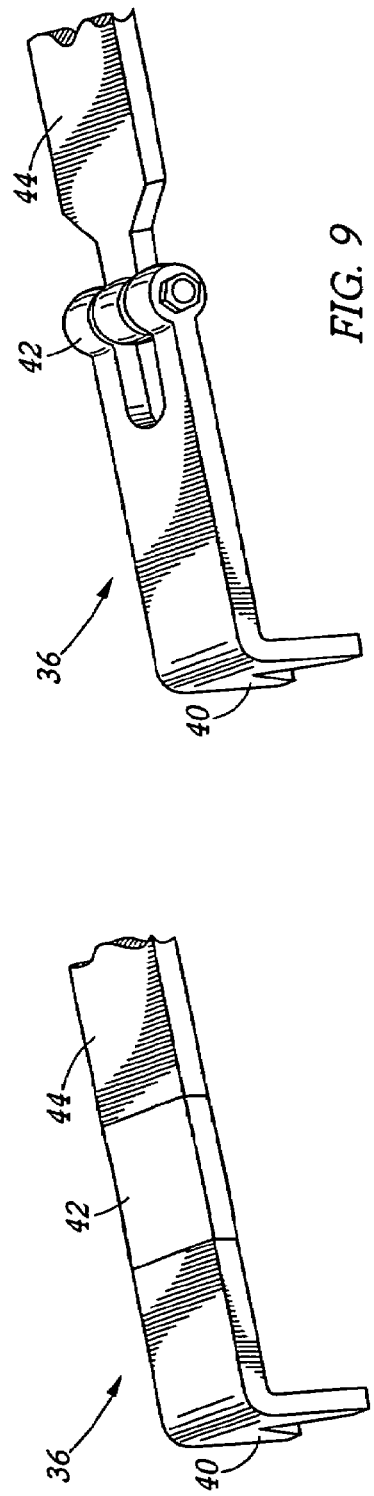
FIG. 9 is a perspective view of an alternative embodiment of a release tool.

Referring now to FIG. 9, an alternative embodiment of the release tool 36 is shown. More specifically, the hinge 42 may include a coil spring or other biasing means that dictates the force required to deflect the tab 44. Alternatively, a mechanism that includes a fastener and nut may be employed wherein selective tightening of the nut will incrementally increase or decrease the stiffness of the hinge 42.

Figure 10:
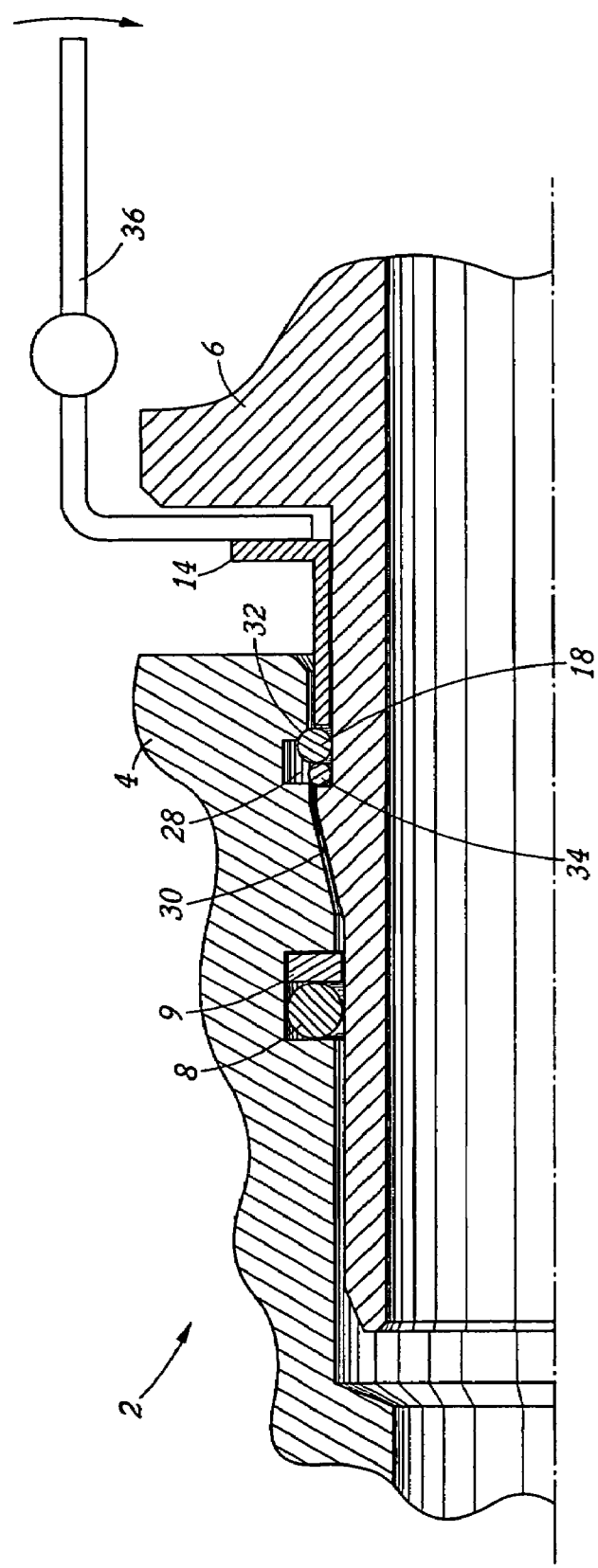
FIG. 10 is a cross-sectional front elevation view of a locking device of another embodiment of the present invention.

Referring now to FIG. 10, an alternative embodiment of the present invention that is similar to that shown in FIG. 7 is shown. More specifically, a device that utilizes a snap ring 18 and an auxiliary ring 34 is shown. This mechanism also utilizes the release mechanism 44 and the release tool 36 to force the snap ring 18 up and around the auxiliary ring 34 and into the snap ring groove 28 when the internal pressure of the coupling 2 is below a predetermined level.

Referring now to FIG. 11, an alternative embodiment of the present invention is shown that utilizes a safety release mechanism 46. More specifically, one embodiment of the present invention includes a safety release mechanism that buckles or limits the amount of force that can be applied to the locking device 10. This embodiment of the present invention does not require the use of a spacer and/or tool that prevents movement of the release mechanism 14. Conversely, this embodiment of the present invention has a safety feature built into the release mechanism 14 that prevents the release mechanism from providing an excessive force to the locking device 10 when the internal pressure of the coupling 2 is above a predetermined level.

Referring now to FIGS. 12-14, the safety release mechanism 46 shown in FIG. 11 may be comprised of a collar that is located circumferentially around the locking device. The ability of the force-limited release mechanism 46 to buckle when a predetermined force is applied is achieved by the incorporation of a plurality of apertures 48, a plurality of grooves 50, areas of thinned material, i.e. webbing 52, or the use of an alternate material. When the user interfaces with the contact surface 54 of the safety release mechanism 46, a certain degree of force may be applied before the apertures 48, grooves 50, webbing 52, or areas of alternate material of the safety release mechanism 46 give way. When the internal pressure is such that the frictional load between the locking device and the female portion of the coupling is reduced to a certain level may the force-limited release mechanism be fully transitioned for disconnection.

Figure 15:
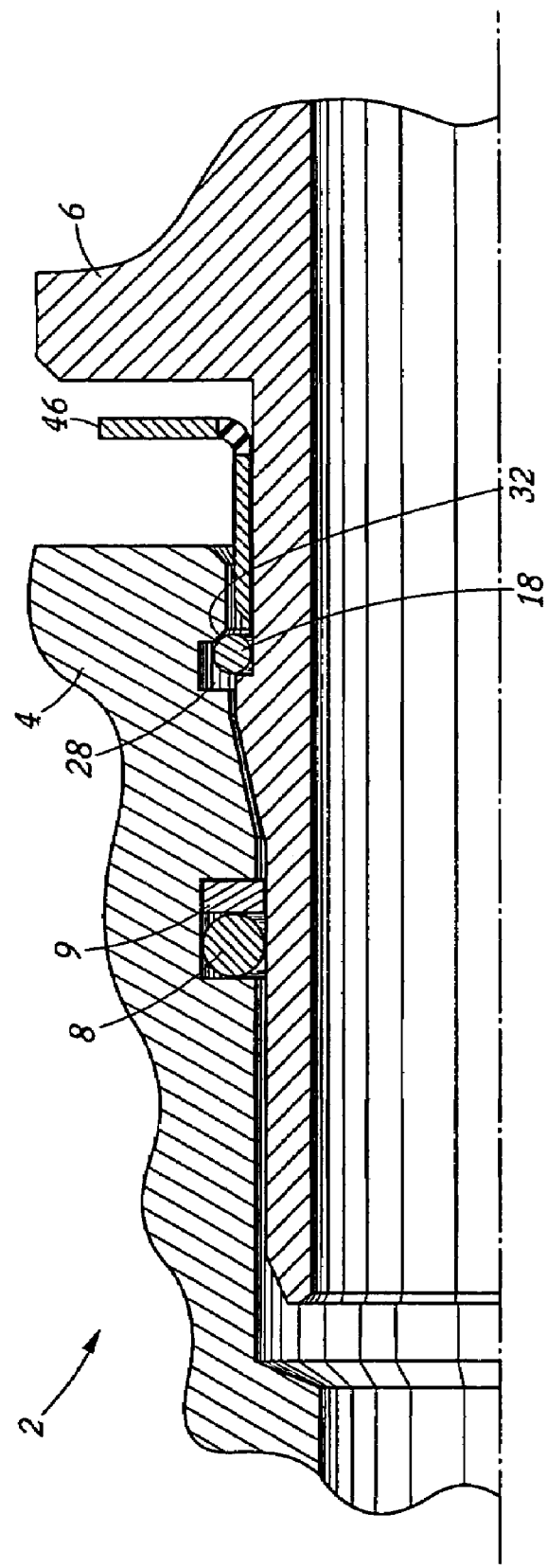
FIG. 15 is a cross-sectional front elevation view of one embodiment of the present invention, and similar to the embodiment shown in FIG. 11 that utilizes a snap ring.

Referring now to FIG. 15, an alternative embodiment of the present invention is shown that is similar to that shown in FIG. 11. More specifically, the snap ring 18 is positioned as previously described to lock the male and female portions of the coupling 2 together. Upon application of force greater than the design yield limit of the safety release mechanism 46, buckling will occur wherein no further load may be applied to the snap ring 18, thus ensuring that the snap ring 18 cannot be unseated from its locked position.

Figure 16:
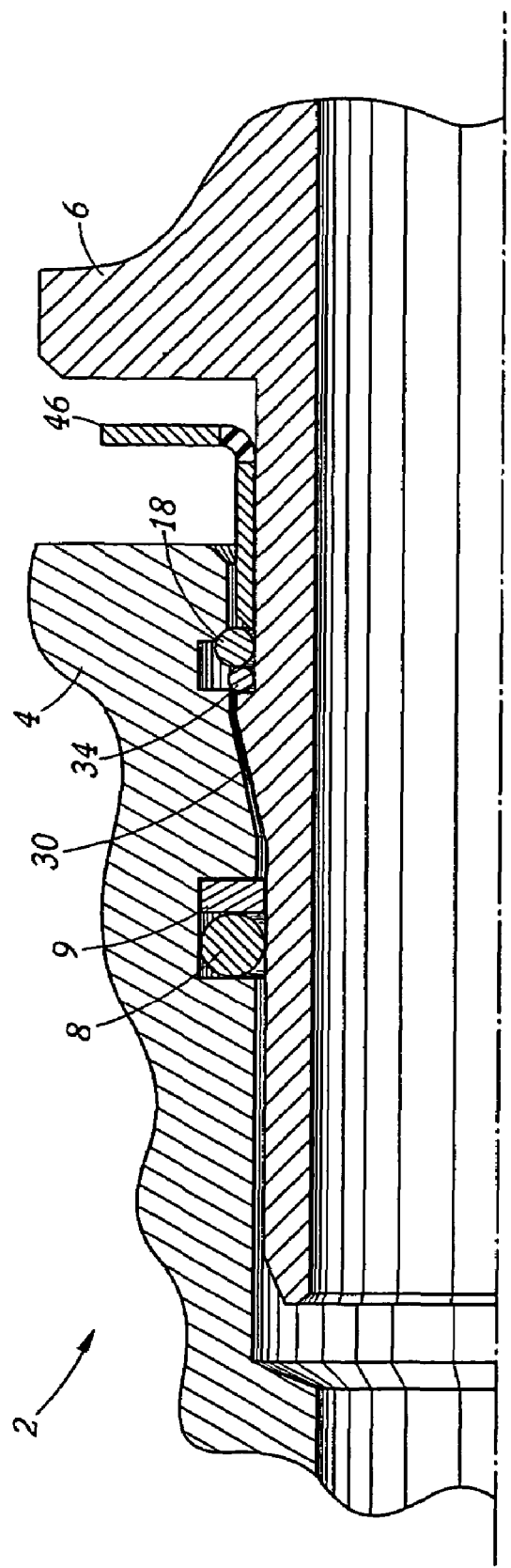
FIG. 16 is a cross-sectional front elevation view of an alternative embodiment of the present invention.

Referring now to FIG. 16, one embodiment of the present invention similar to that shown in FIG. 15 is shown that utilizes a snap ring 18 and an auxiliary ring 34.

Referring now to FIGS. 17 and 18, yet another embodiment of the present invention that employs a safety release mechanism 46 is shown. More specifically, this embodiment of the present invention includes a force-limited release mechanism that includes a webbing 52 or area of decreased structural integrity positioned adjacent to a forward portion of the safety release mechanism 46 that interacts with the snap ring 18. In addition, a diversion groove 56 is provided that receives the release mechanism 46 if the pressure inside the coupling 2 is above a predetermined level. In operation, the safety release mechanism 46 initially engages the snap ring 18. If the internal pressure of the coupling is above a certain level, the snap ring 18 will be firmly seated against bearing surfaces 32 of the female and male portions of the coupling 2. The bearing loads within the coupling 2 will be such that the safety release mechanism 42 will be unable to unseat the snap ring 18 and the forward portion of the release mechanism will be forced into the diversion groove 56. Upon a pressure reduction, the loads on the snap ring 18 will be decreased and contact with the release mechanism 42 will force the snap ring 18 into the snap ring groove 28, to allow the coupling 2 to be disconnected.

Referring now to FIGS. 19 and 20, an embodiment of the present invention similar to that shown in FIGS. 17 and 18 is shown. More specifically, this embodiment of the present invention utilizes a snap ring 18 that interacts with an auxiliary ring 34 to facilitate locking and unlocking of the male and female portions of the coupling 2.

Referring now to FIGS. 21-25, another embodiment of the present invention is provided that substantially prevents the inadvertent movement of the locking device and/or snap ring. More specifically, a restriction mechanism 58 is shown that resides between the stem 22 of the male portion 6 and the locking device 10 such that pressure applied to the release mechanism 14 will not transition it into the release groove 24 of the male portion 6. Alternatively, a channel 60 may be machined into the female portion 4 wherein the restriction device may be inserted to restrict deflection of the snap ring.

Figure 21:
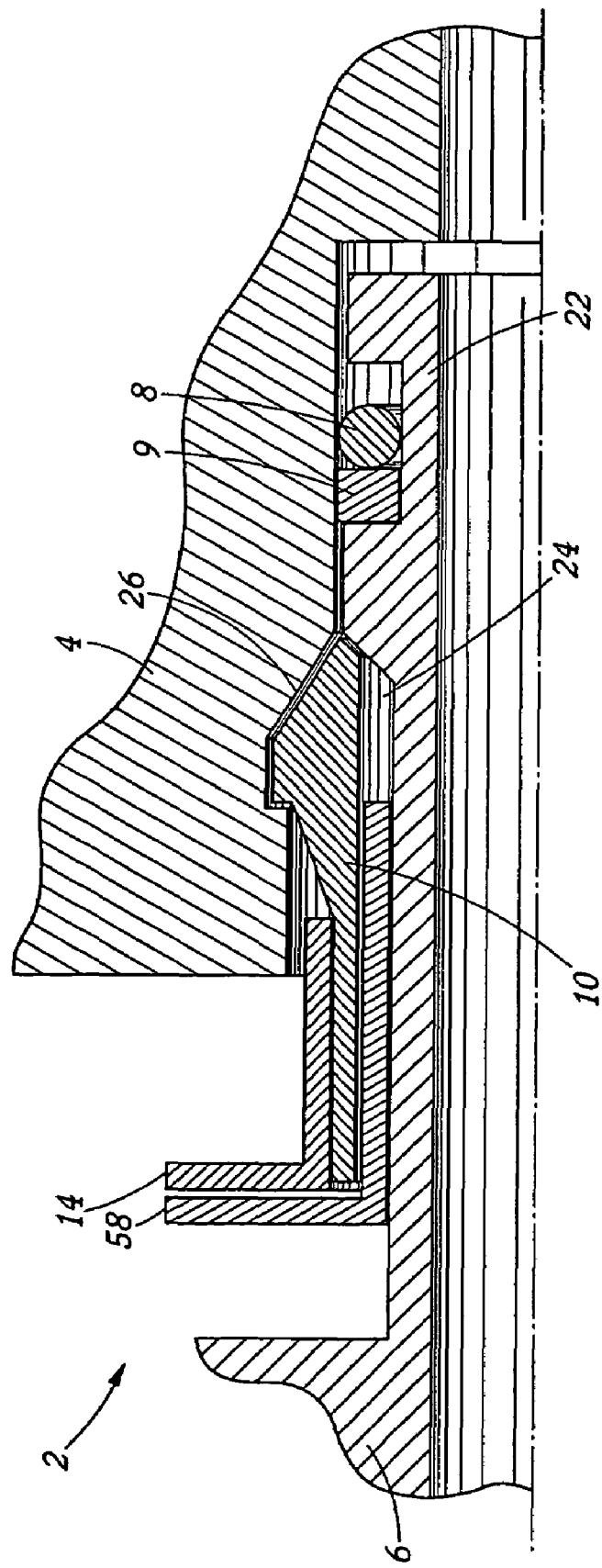
FIG. 21 is a cross-sectional front elevation view of another embodiment of the present invention that utilizes a restricting mechanism that prevents the locking device from inadvertently unlocking.

Referring more specifically to FIG. 21, the restriction mechanism 58 that is placed between the locking device 10 and the release mechanism 14 is shown. The restriction mechanism 58 selectively slides adjacent to the release groove 24 of the coupling 2 such that it must be at least partially retracted, i.e. moved to the left, in order for the release mechanism 14 to effectively transition the locking device 10 out of the locking groove 26 of the female portion. Alternatively, the restriction mechanism 58 may rotate around the male portion 6 to align gaps machined therein with gaps of the locking device 10 to allow disconnection. When locked, the restriction mechanism 58 would be rotated such that solid portions thereof reside under solid portions of the locking device 10.

Referring now to FIGS. 22 and 23, an alternative embodiment of the present invention that utilizes the snap ring 18 is provided herein. More specifically, this embodiment of the present invention includes at least one channel 60 machined into the adapter port face 20 of the female portion 4 that receives a restricting mechanism (not shown) that effectively blocks the snap ring groove 28. Hence, no degree of force applied to the snap ring 18 is capable of deflecting it back into the snap ring groove 28, thereby ensuring that the snap ring 18 remains in its locked position. Thus, this and the previously described embodiments with restricting mechanisms provide an additional safety feature wherein a user performs a multistep procedure for disconnecting the coupling 2.

Figure 24:
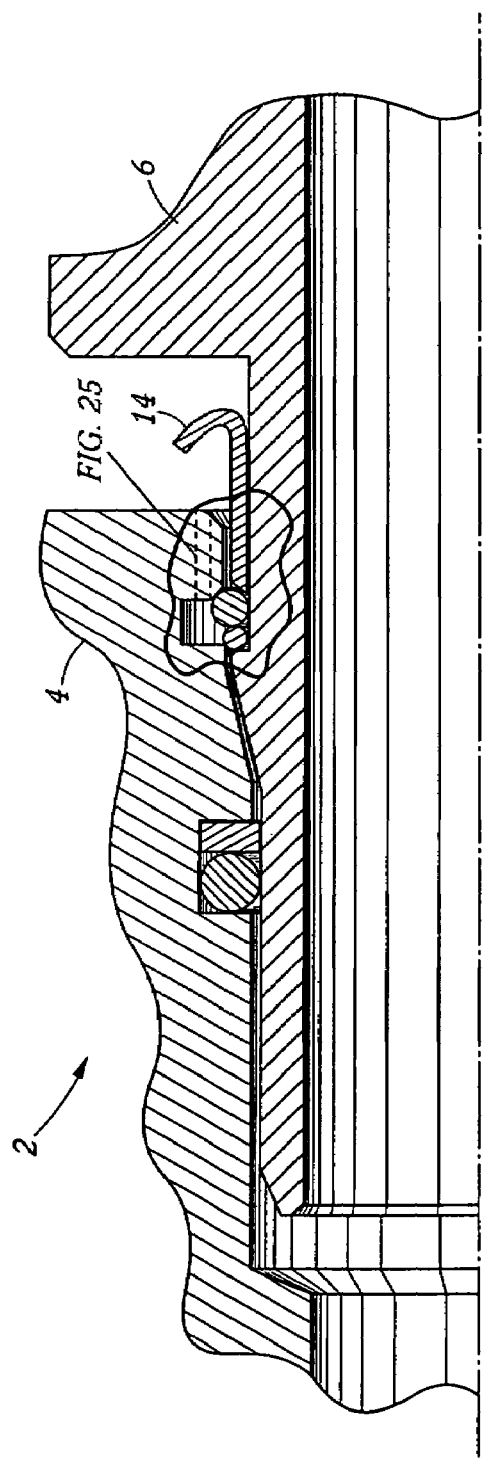
FIG. 24 is a cross-sectional front elevation view of another embodiment of the present invention similar to that shown in FIG. 22.
Figure 25:
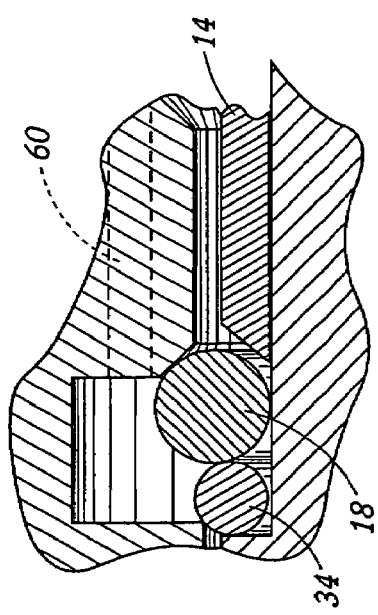
FIG. 25 is a detailed view of the embodiment shown in FIG. 24.

Referring now to FIGS. 24 and 25, one embodiment of the present invention similar to that shown in FIG. 22 is shown that employs a snap ring 18 that engages an auxiliary ring 34. This embodiment of the present invention operates as described above, wherein a restriction mechanism is placed in the channel 60 to prohibit movement of the snap ring 18.

Referring now to FIGS. 26-29, further embodiments of the present invention that employ a secondary locking groove 62 and/or an obstruction 64 machined into the lock release groove 24 are shown. More specifically, a locking device that includes a protrusion 66 that interfaces with a receiving groove 62 that ensures that the lock 10 will remain in place until internal pressure is reduced is shown. Alternatively, a stop 64 may be provided that prevents radial displacement of the locking device 10 into the lock release groove 24 unless pressure is reduced.

Figure 26:
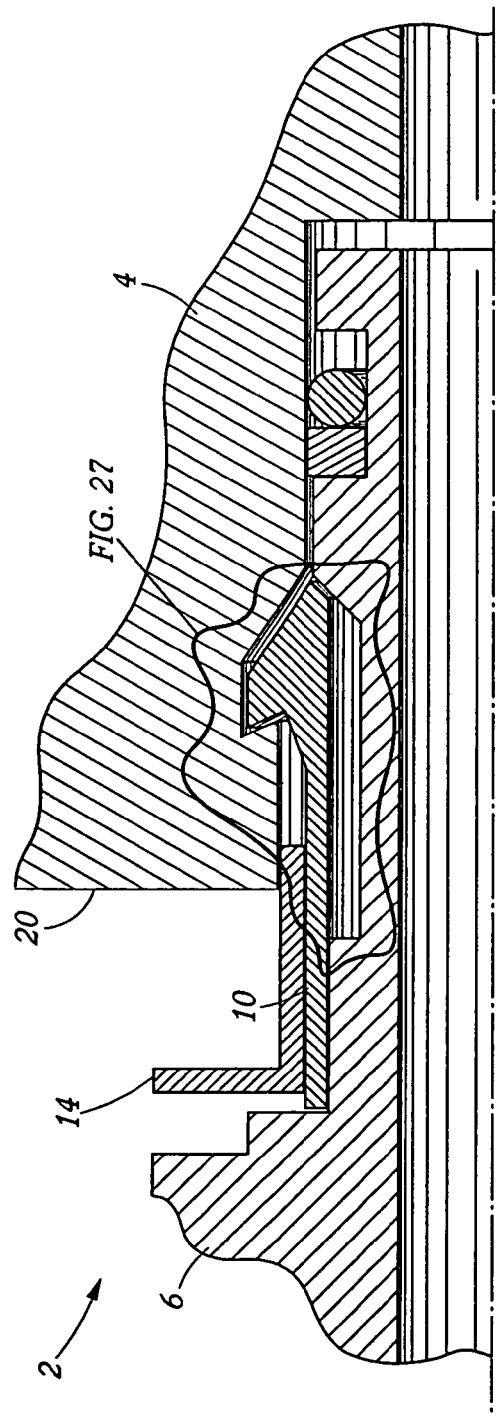
FIG. 26 is a partial cross-sectional front elevation view of another embodiment of the present invention that employs a locking device with an auxiliary protrusion for engaging a receiving groove in the female portion of the coupling.
Figure 27:
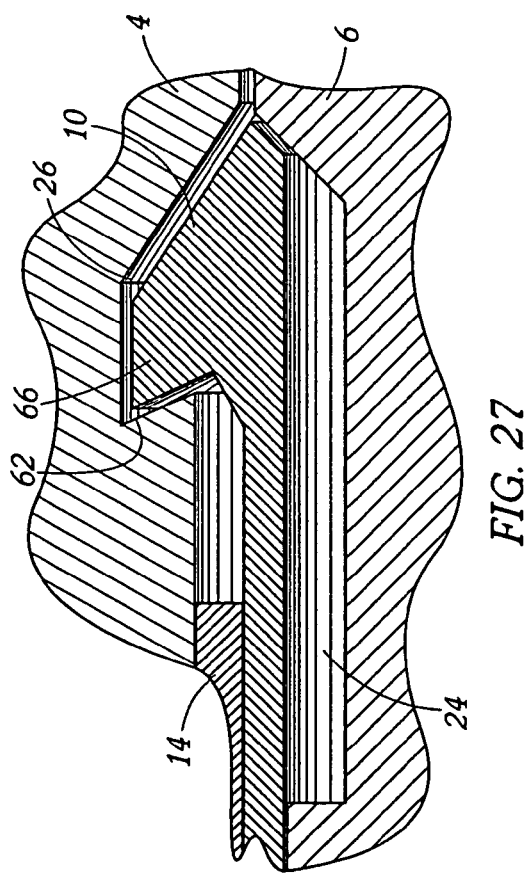
FIG. 27 is a detailed view of the embodiment shown in FIG. 26.

Referring more specifically to FIGS. 26 and 27, one embodiment of the present invention that includes a locking device 10 with a protrusion 66 that engages a receiving groove 62 in the female portion 4 is shown. Similar to the embodiments shown above, this embodiment of the present invention includes a locking device 10 with a thicker reversed, angled area that interacts with the locking groove 26 of the female portion 4. In addition, the locking groove 26 of this embodiment of the present invention includes a recess, or receiving groove 62. The locking device 10 is similar to that shown and described above, however it also includes a protrusion 66 for the engagement inside the receiving groove 62. Upon insertion, the locking device 10 initially engages the port adapter face 20 of the female portion 4 thereby deflecting it into the release groove 24 of the male portion 6. Once the protrusion 66 of the locking device 10 clears an edge of the locking groove 26 of the female portion 4, it is able to return to its nominal shape thus locking it into the locking groove 26 of the female portion 4. As pressure is added to the coupling 2, the male portion 6 and female portion 4 will separate, thereby forcing the protrusion 66 into the receiving groove 62 and ensuring that the locking device 10 cannot be redeflected into the release groove 24. When the internal pressure is reduced, the two portions of the coupling may be physically forced together wherein the protrusion 66 will clear the receiving groove 62 when the release mechanism 14 is actuated.

Referring now to FIGS. 28 and 29, an alternative embodiment of the present invention is shown that includes an obstruction or stop 64 machined into the lock release groove 24 which prevents the radial deflection of the locking device 10. More specifically, this embodiment of the present invention includes a smaller locking release groove 24. As pressure is introduced to the coupling 2, the locking device 10 will bear upon the locking groove 26 of the female portion 4. The stop 64 prohibits the locking device 10 from transitioning into the release groove 24 regardless of the force imparted on the release mechanism 14. Reduction of pressure will allow the coupling portions to be further interconnected wherein the end of the locking device 10 will clear the stop when the release mechanism is actuated.

Referring now to FIGS. 30-44, embodiments of the present invention that selectively employ sloped surfaces and/or bearing surfaces 32 of the locking grooves are shown. More specifically, it has been shown that the selective alteration of the relative angles of bearing surfaces 32 and/or sloped surfaces that interact with locking devices 10 and/or snap rings 16 change the force required to unseat the locking device 10 and/or snap ring 16. The embodiments shown in the FIGS. 30-44 utilize the normal forces generated by the bearing surfaces 32 to ensure that the coupling 2 cannot be disconnected when it is exposed to a pressure of a predetermined level.

Figure 30:
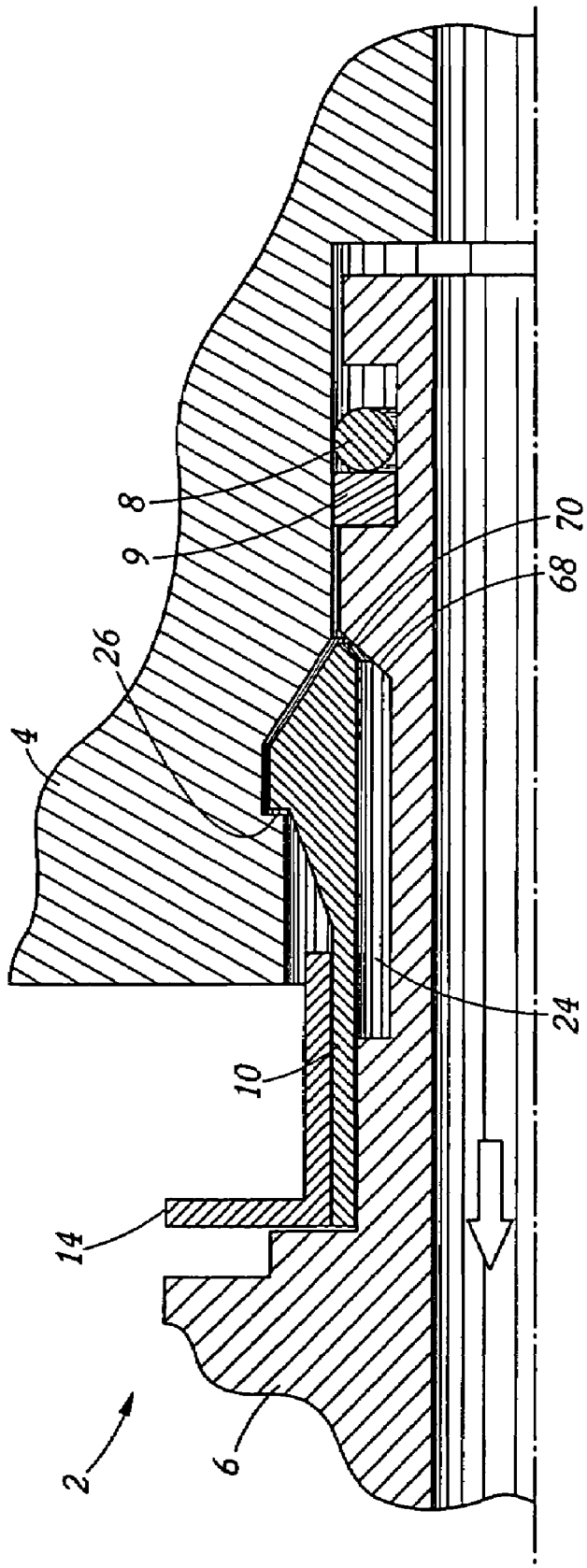
FIG. 30 is a partial cross-sectional front elevation view of another embodiment of the present invention that utilizes a locking device that firmly engages the female portion of the coupling at a predetermined pressure level.

Referring more specifically to FIG. 30, one embodiment of the present invention that utilizes a locking device is shown.

As described above, as the pressure in the coupling increases, the tendency of the male portion 6 and the female portion 4 to separate increases. This separation creates a bearing load between an edge of the locking groove 26 and the locking device 10. One embodiment of the present invention includes a lock release groove with a sloped surface 68 that partially obstructs the movement of the locking devices 10. Thus the male portion 6 is inserted deeper into the female portion 4 in order for an obstruction free path for radial movement of the locking device 10 to be provided, which is achieved when the pressure of the coupling 2 is reduced below a predetermined level. This movement will force a beveled edge 70 of the locking device 10 against a beveled portion of the locking groove 26, thus forcing the locking device 10 into the lock release groove 24.

Figure 31:
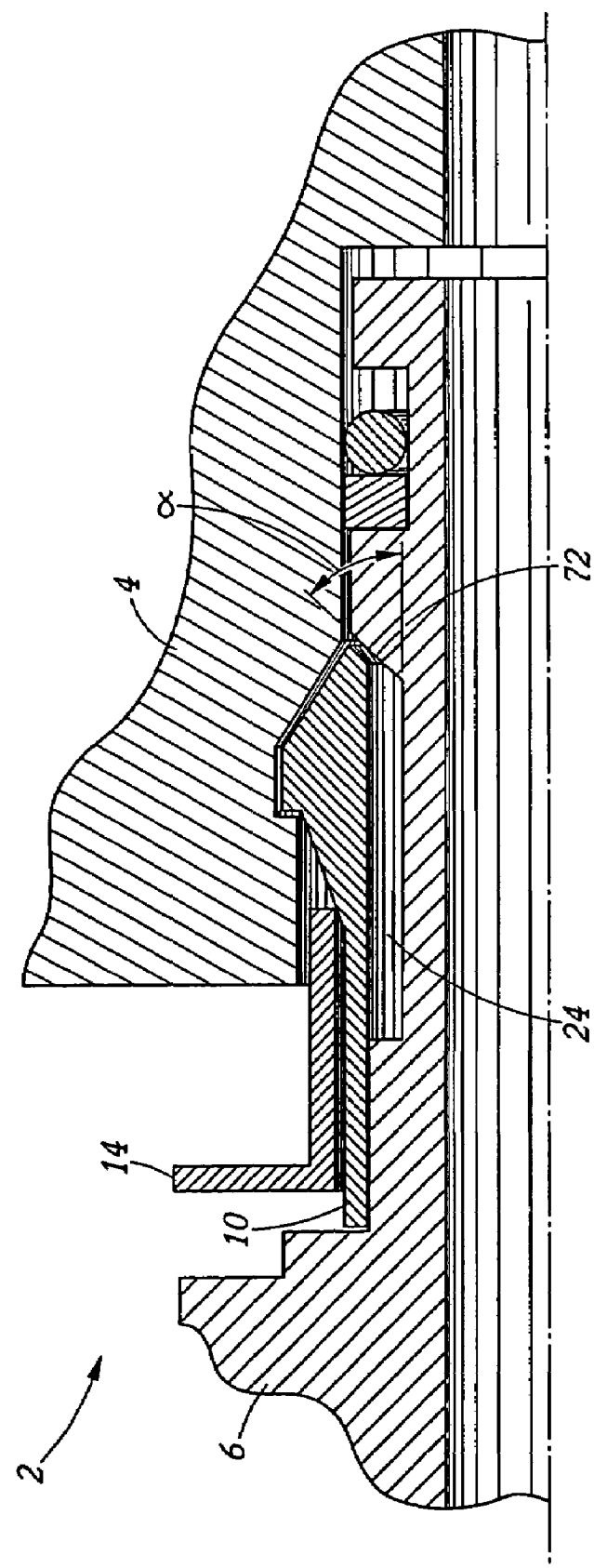
FIG. 31 is a partial cross-sectional front elevation view of an alternate embodiment of the present invention that employs a snap ring which is positioned adjacent to two bearing surfaces when the coupling is exposed to a predetermined pressure and the retaining clip is seated such that the release mechanism is inhibited from releasing the coupling.

Referring now to FIG. 31, a sloped angle 72 of the lock release groove 24 is provided that may be selectively chosen. More specifically, the steeper the angle of the sloped surface, the more difficult it will be to radially translate the locking device 10 into the locking release groove 24. Thus, if the pressure in the coupling 2 is high, a sloped surface of a high angle would be used such that it would be more difficult to disconnect the coupling 2.

Figure 32:
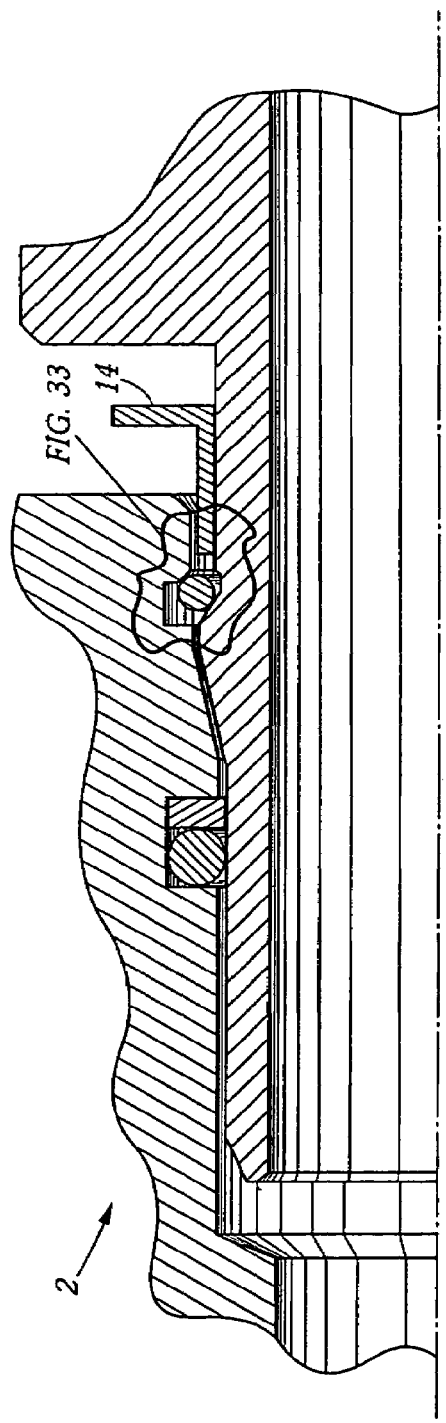
FIG. 32 is a partial cross-sectional front elevation view of an alternative embodiment of the present invention that employs a snap ring which is positioned adjacent to two bearing surfaces when the coupling is exposed to a predetermined pressure.
Figure 33:
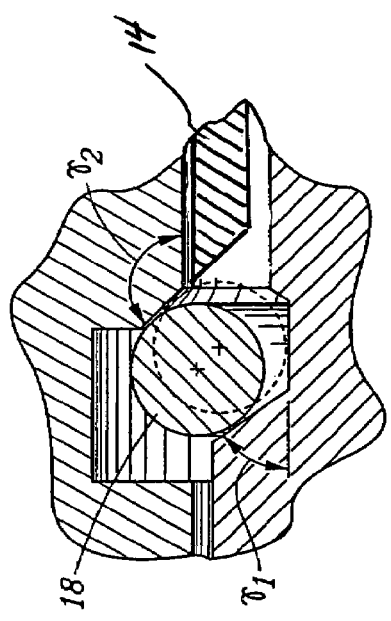
FIG. 33 is a detailed view of the embodiment shown in FIG. 32.
Figure 36:
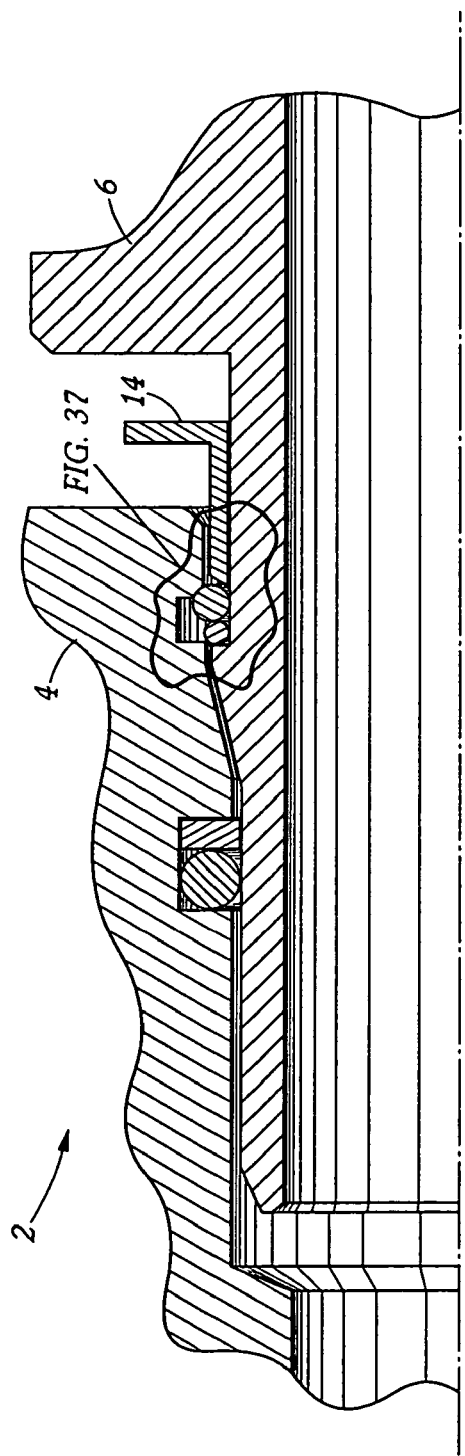
FIG. 36 is a partial cross-sectional front elevation view of an alternative embodiment of the present invention similar to that shown in FIG. 34.
Figure 37:
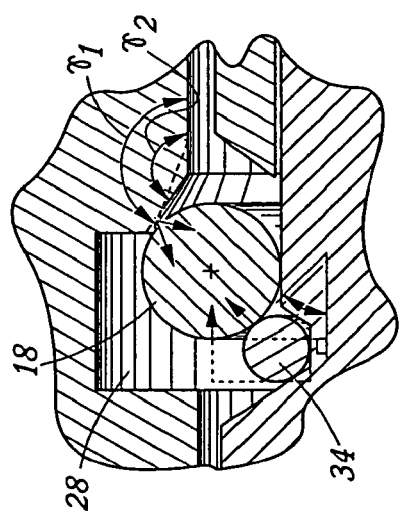
FIG. 37 is a detailed view of the embodiment of the invention shown in FIG. 36 and depicting the interaction of forces on the snap ring during pressurization.
Figure 38:
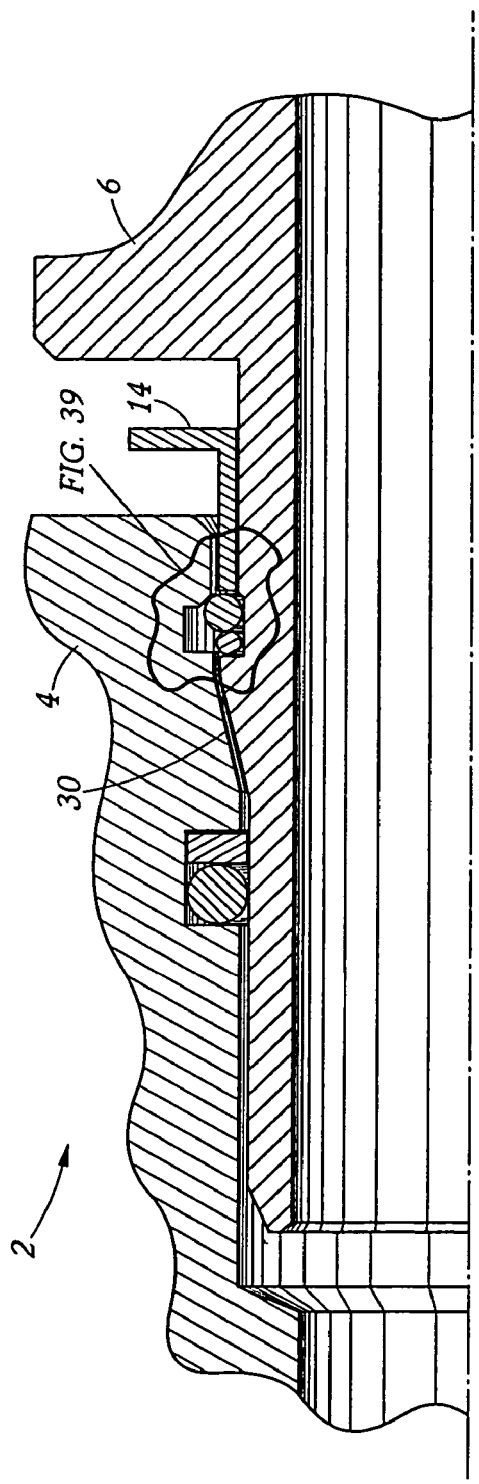
FIG. 38 is a cross-sectional front elevation view of an embodiment of the present invention which is similar to that shown in FIG. 32.
Figure 39:
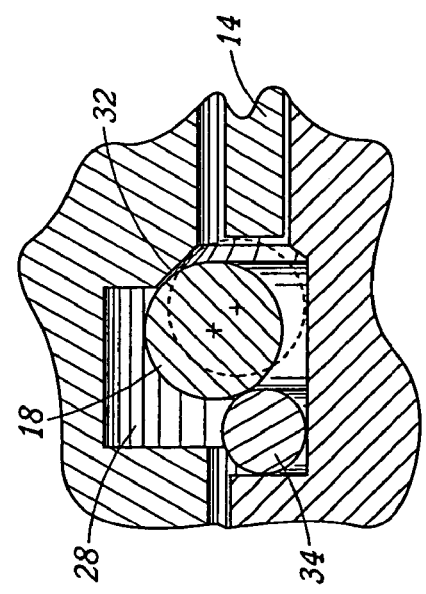
FIG. 39 is a detailed view of the embodiment shown in FIG. 38.
Figure 40:
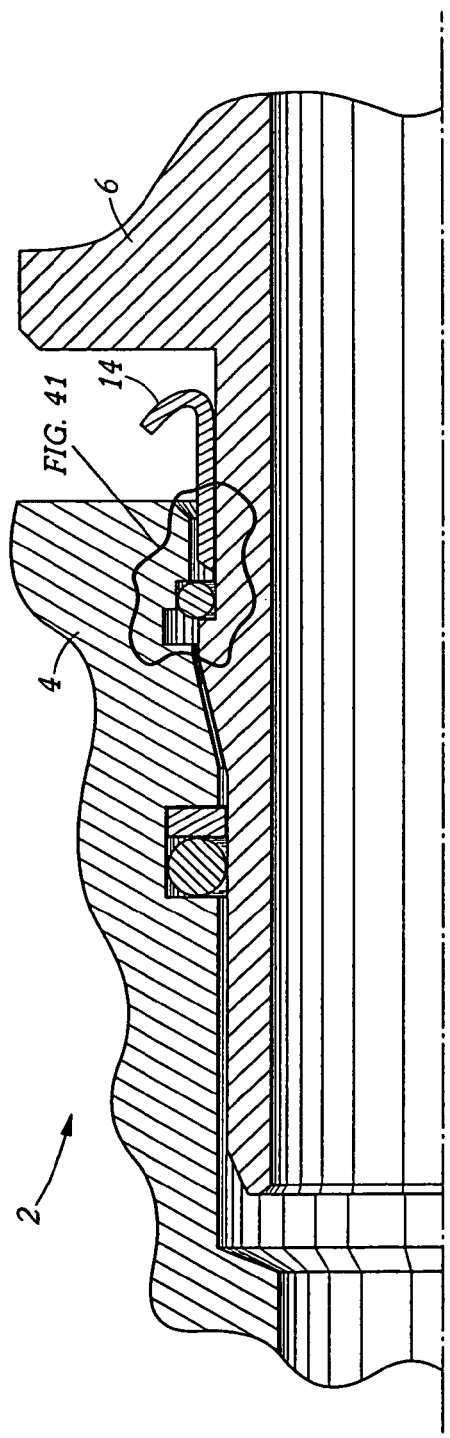
FIG. 40 is a partial cross-sectional front elevation view of another embodiment of the present invention that substantially prevents inadvertent disconnection of the coupling unless the pressure of the coupling is reduced to a predetermined level.
Figure 41:
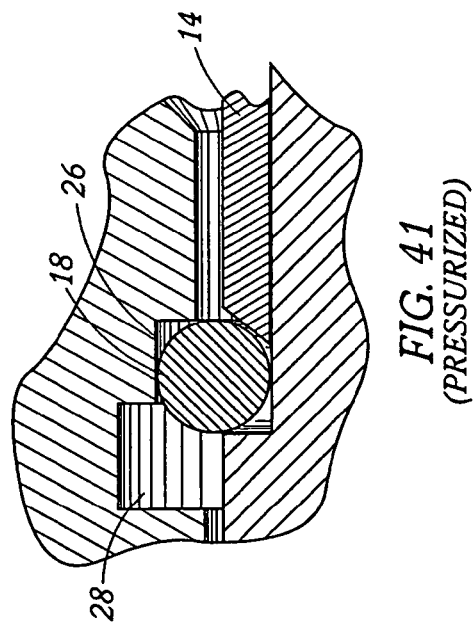
FIG. 41 is a detailed view of the embodiment shown in FIG. 40.
Figure 42:
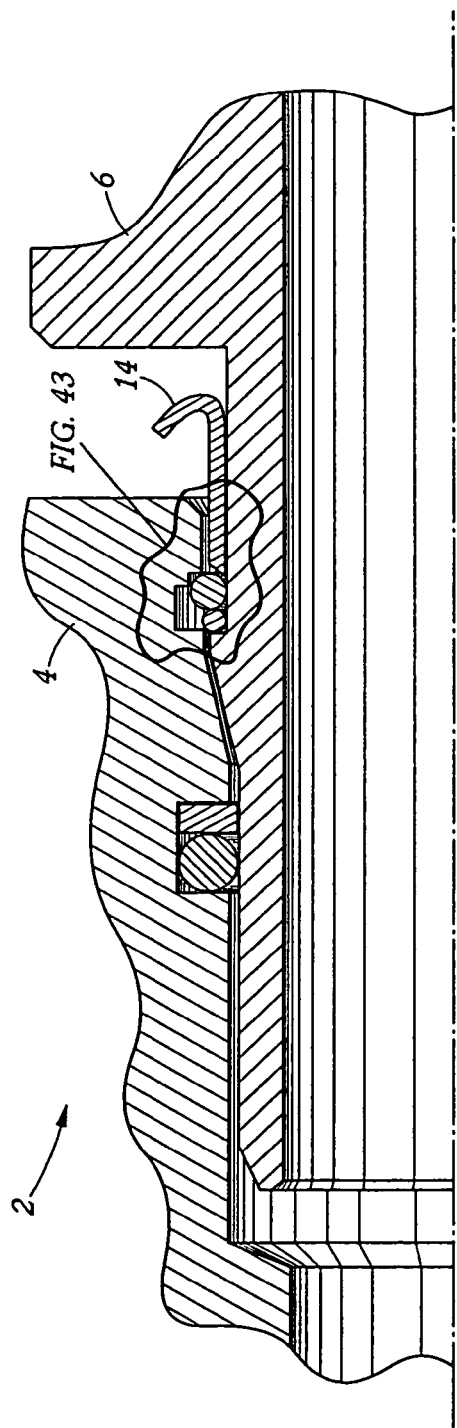
FIG. 42 is a partial cross-sectional front elevation view of another embodiment of the present invention similar to that shown in FIG. 40.
Figure 43:
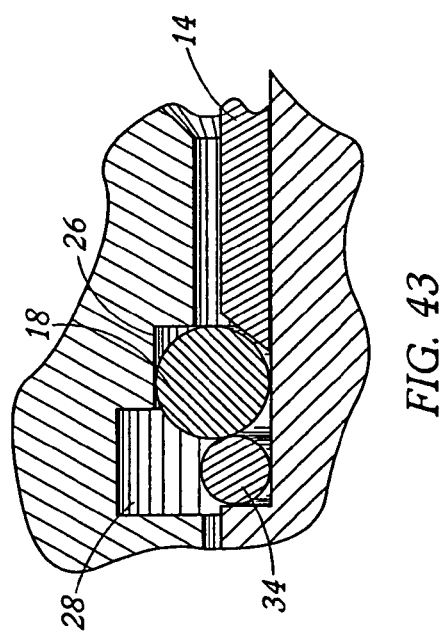
FIG. 43 is a detailed view of the embodiment shown in FIG. 42.

Referring now to FIGS. 32-39, an embodiment of the coupling 2 that utilizes the snap ring 18 is shown. As shown in FIG. 33, the interactions of the snap ring bearing surfaces 32 on the snap ring 18 are shown. Selection of the snap ring bearing surface angles ($\gamma_1$ and $\gamma_2$) will affect the amount of force required from the release mechanism 14 to unseat the snap ring 18 into the snap ring groove 28. For example, the shallower the upper snap ring bearing surface angle ($\gamma_2$), the easier it is to unseat the snap ring 18. Thus it may be desirable to increase the angle to ensure maximum bearing loads are applied to the snap ring 18 to ensure a significant amount of force is required to unseat it. More specifically, these embodiments include snap rings 18 that are expanded into grooves of the female portion for interconnection and disconnection of the male portion and the female portion. When the system is pressurized, the bearing loads are such that no amount of force imparted by the release mechanism 14 will expand the snap ring to facilitate decoupling.

Referring specifically to FIGS. 32 and 33, when the coupling is under pressure the retaining ring 18 is moved into the recess of stem 22 such that any force applied by the release mechanism 14, particularly a release mechanism such as shown in FIG. 53 having a reversed angled engagement surface lock release tip 92, results in ring 18 being more tightly locked against the stem. When pressure is relieved, and ring 18 is thereby in a free state, release mechanism 14 may preferably be used to release the coupling.

Referring now to FIGS. 40-43, another embodiment of the present invention is shown. This embodiment of the present invention includes a locking groove 26 and a snap ring groove 28. When the two grooves are aligned, the snap ring 18 may be unseated from its locked position. In order to perform such an alignment, the pressure of the system is reduced below a predetermined level to allow the male portion 6 to be further inserted into the female portion 4. The release mechanism may then be actuated to expand the snap ring 18 into the snap ring groove 28.

Referring now to FIGS. 44-46, one embodiment of the present invention that includes a lock release assembly 80 is provided. The lock release assembly 80 is generally comprised of an outer cylinder 82 that is located around the lock release mechanism 14. The lock release assembly 80 also includes an inner cylinder 84 that is used to selectively obstruct the lock release mechanism 14. The inner cylinder 84 selectively rotates within a gap 16 inside the outer cylinder 82. The inner cylinder 84 may also be spring loaded such that it may be securely locked. In operation, the inner cylinder 84 is transitioned to create an obstruction, similar to the spacer 12 previously described and shown in FIGS. 2-5, wherein the lock release mechanism 14 cannot be significantly actuated when the spacer 12 is positioned between the release mechanism 14 and the adaptor port face 20. The inner cylinder 84 of the lock release assembly 80 may be altered to rotate away from the lock release mechanism 14 to provide a free path, or a greater space, for the lock release mechanism 14 movement.

Figure 47:
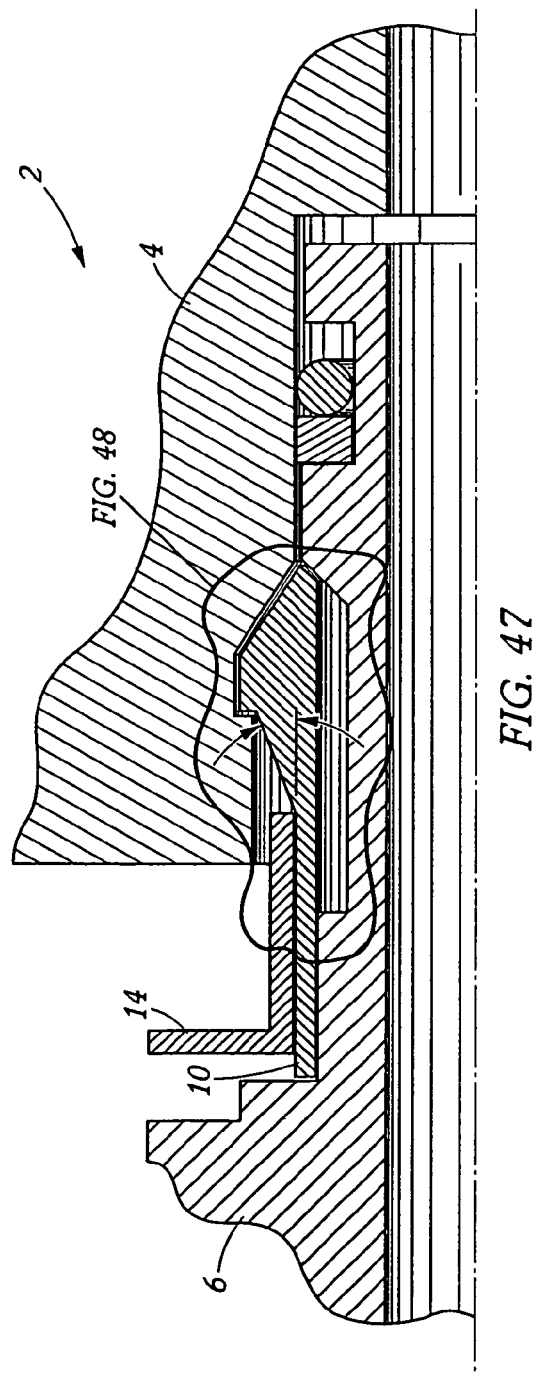
FIG. 47 is a cross-sectional front elevation view of an alternative embodiment of the present invention that employs a locking device with a release mechanism engagement surface with a steep angle that substantially impedes lock disengagement.
Figure 48:
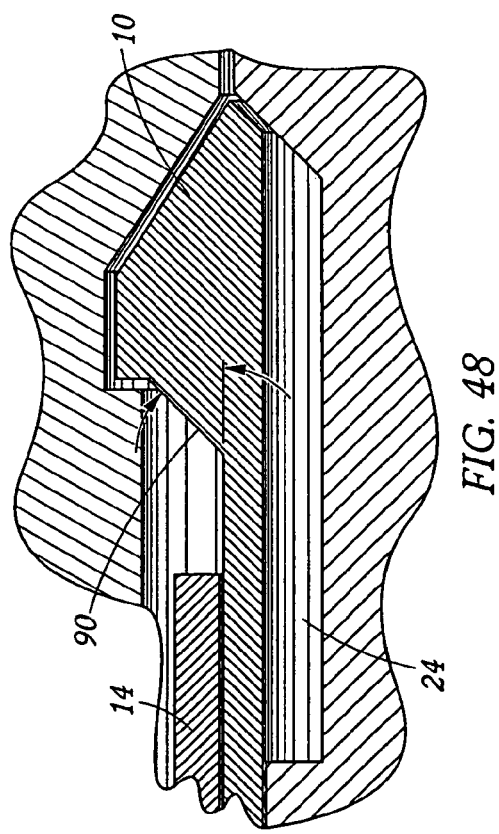
FIG. 48 is detailed view of the embodiment shown in FIG. 47.
Figure 54:
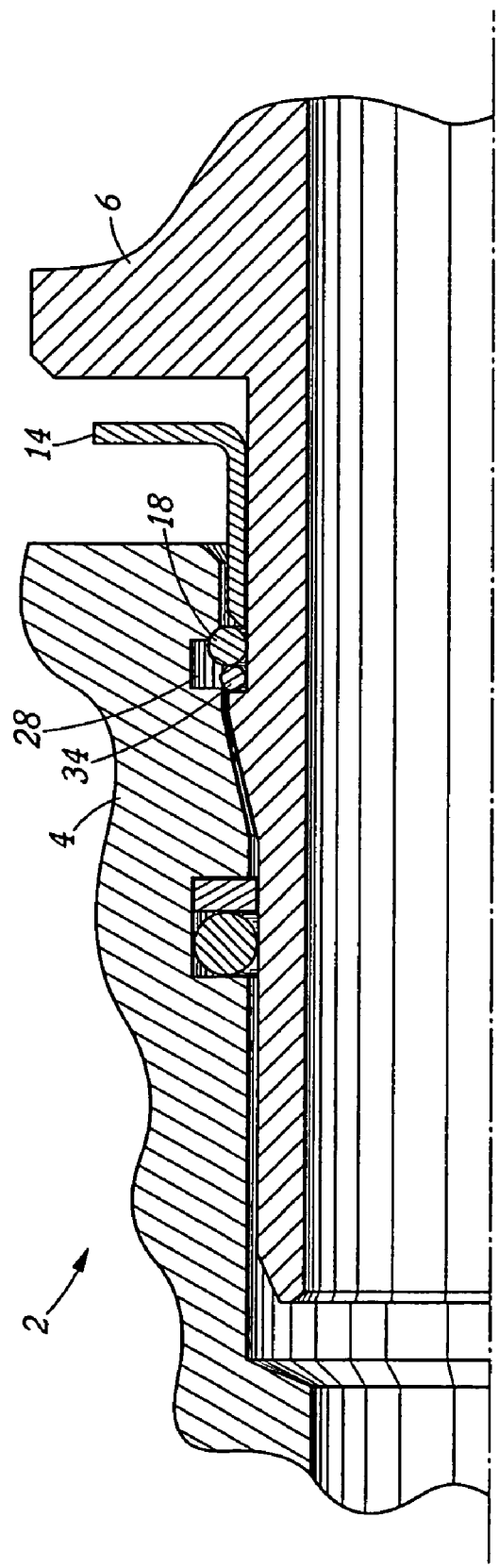
FIG. 54 is a partial cross-sectional front elevation view similar to that shown in FIG. 49.

Referring now to FIGS. 47-48, a release mechanism engagement surface 90 of the locking device 10 may be altered such that less mechanical advantage is generated. These depictions show that as the release mechanism engagement surface 90 angle is increased, less radial force is generated. The lower the radial force, the less mechanical advantage is obtained that will displace the locking device 10 into the lock release groove 24. Thus, one way to ensure that the locking device is releasable at a certain pressure level is to increase the angle of the release mechanism engagement surface 90 thereby requiring more force to be applied thereto to facilitate the same amount of deflection for release.

Referring now to FIGS. 49-54, various embodiments of the present invention that utilize a snap ring 18 are shown along with a lock release mechanisms 14. With specific reference to FIGS. 51-54, the end of the lock release mechanism 14 may be tailored to dictate the amount of force they apply to the snap ring. More specifically, the shallower the angle 92, the greater the upward force applied to the snap ring 18. Thus one of ordinary skill in the art will appreciate that the sloped surface of the lock release mechanism 14 may be altered to provide the optimum snap ring unseating force.

Figure 55:
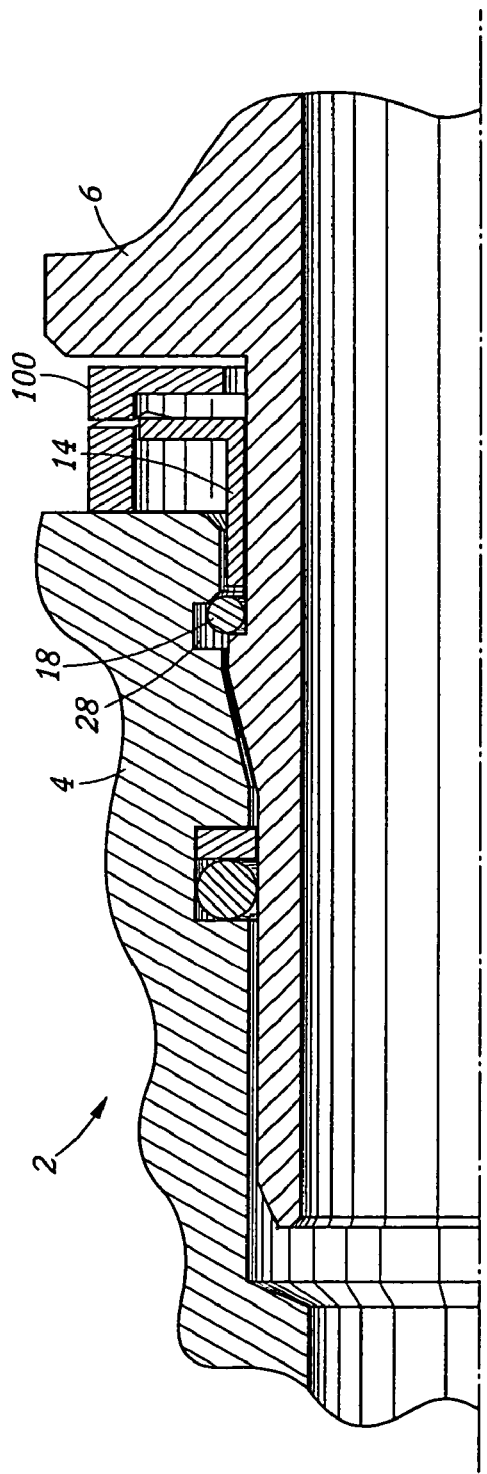
FIG. 55 is a cross-sectional front elevation view of an alternative embodiment of the present invention that employs a cam in operable engagement with the release mechanism.
Figure 56:
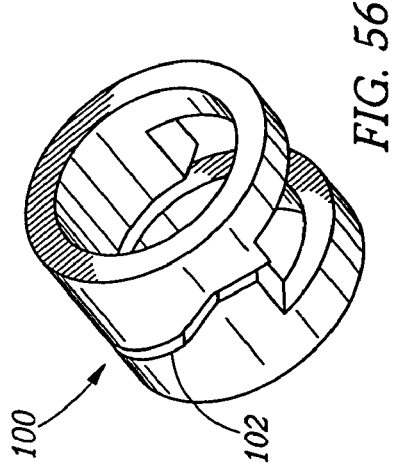
FIG. 56 is a perspective view of the cam used with the embodiment shown in FIG. 55.
Figure 57:
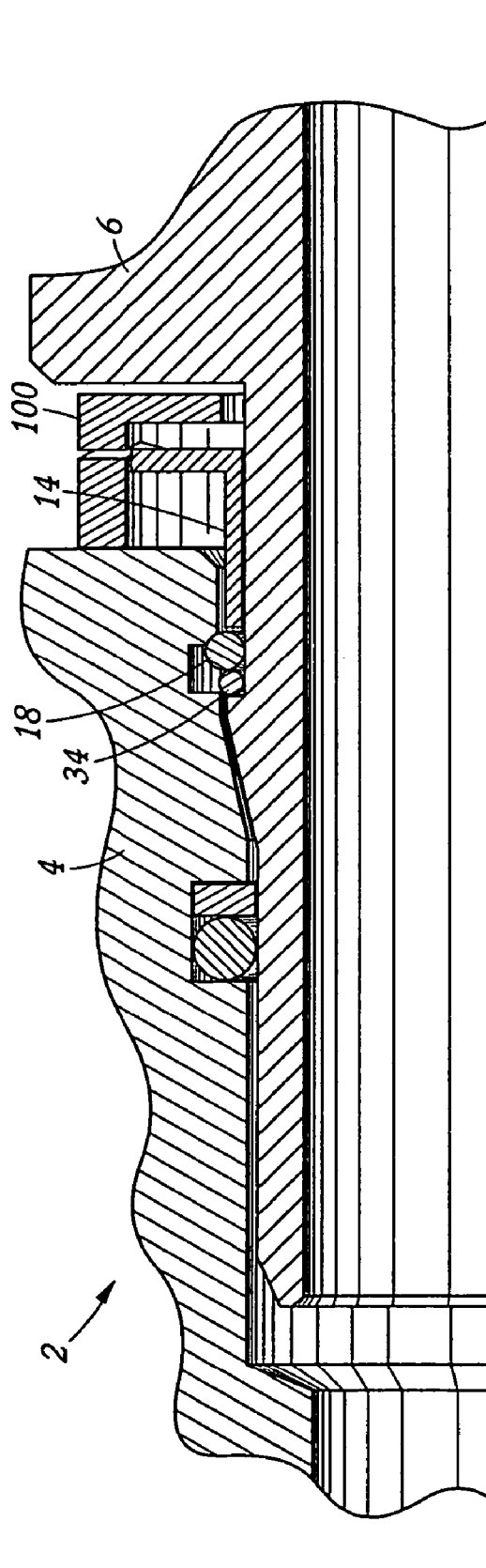
FIG. 57 is a partial cross-sectional front elevation view of an alternative embodiment of the present invention, and which is similar to that shown in FIG. 55.
Figure 58:
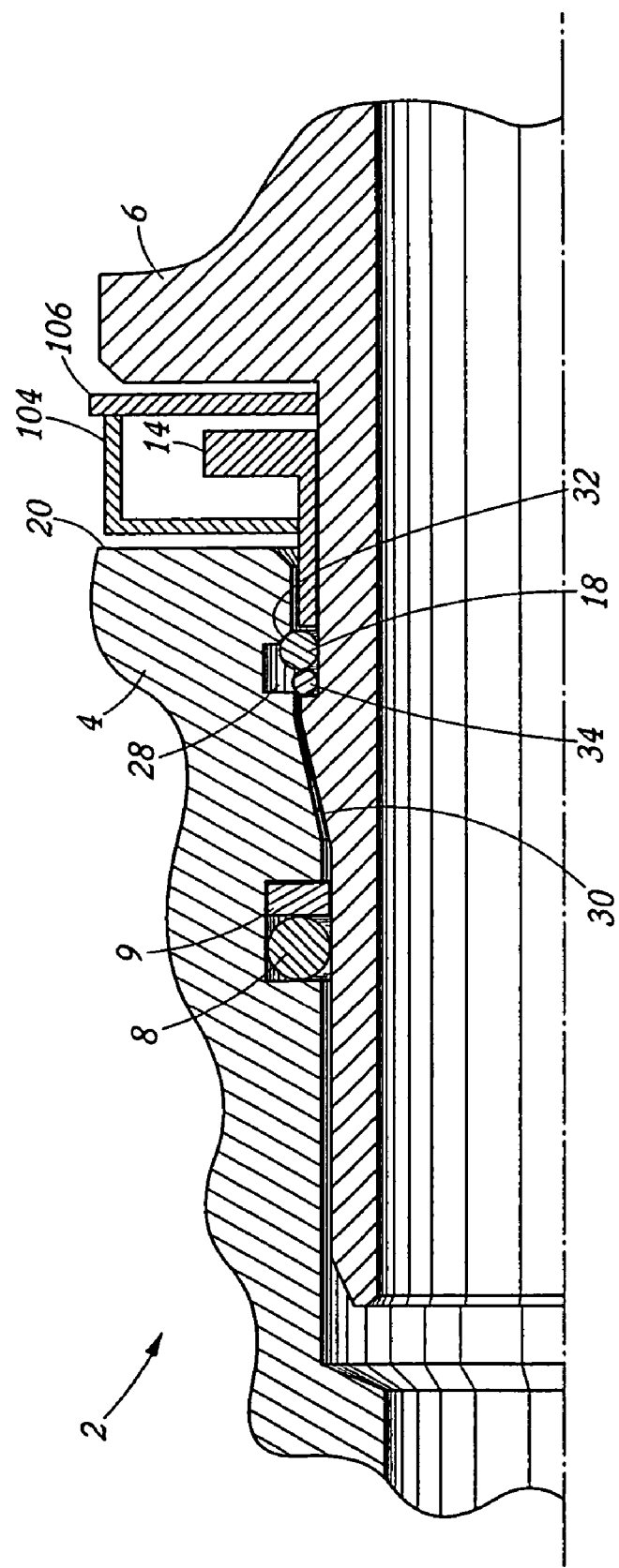
FIG. 58 is a partial cross-sectional front elevation view of an alternative embodiment of the present invention that employs a shroud member that substantially prevents access to the release mechanism.
Figure 59:
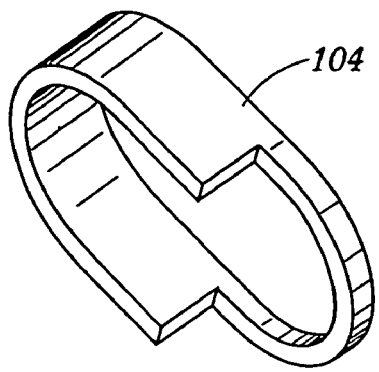
FIG. 59 is a perspective view of a portion of an obstructing sleeve.
Figure 60:
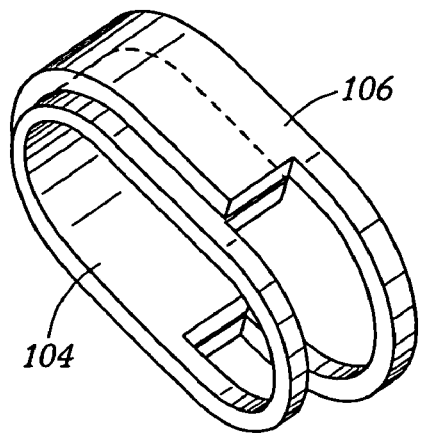
FIG. 60 is a perspective view of two interconnected pieces of an obstructing sleeve shown in a position that allows access to the release mechanism.
Figure 61:
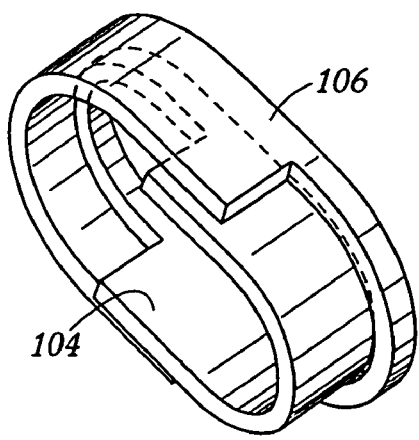
FIG. 61 is a perspective view of two interconnected pieces of an obstructing sleeve shown in a position that prevents access to the release mechanism.
Figure 62:
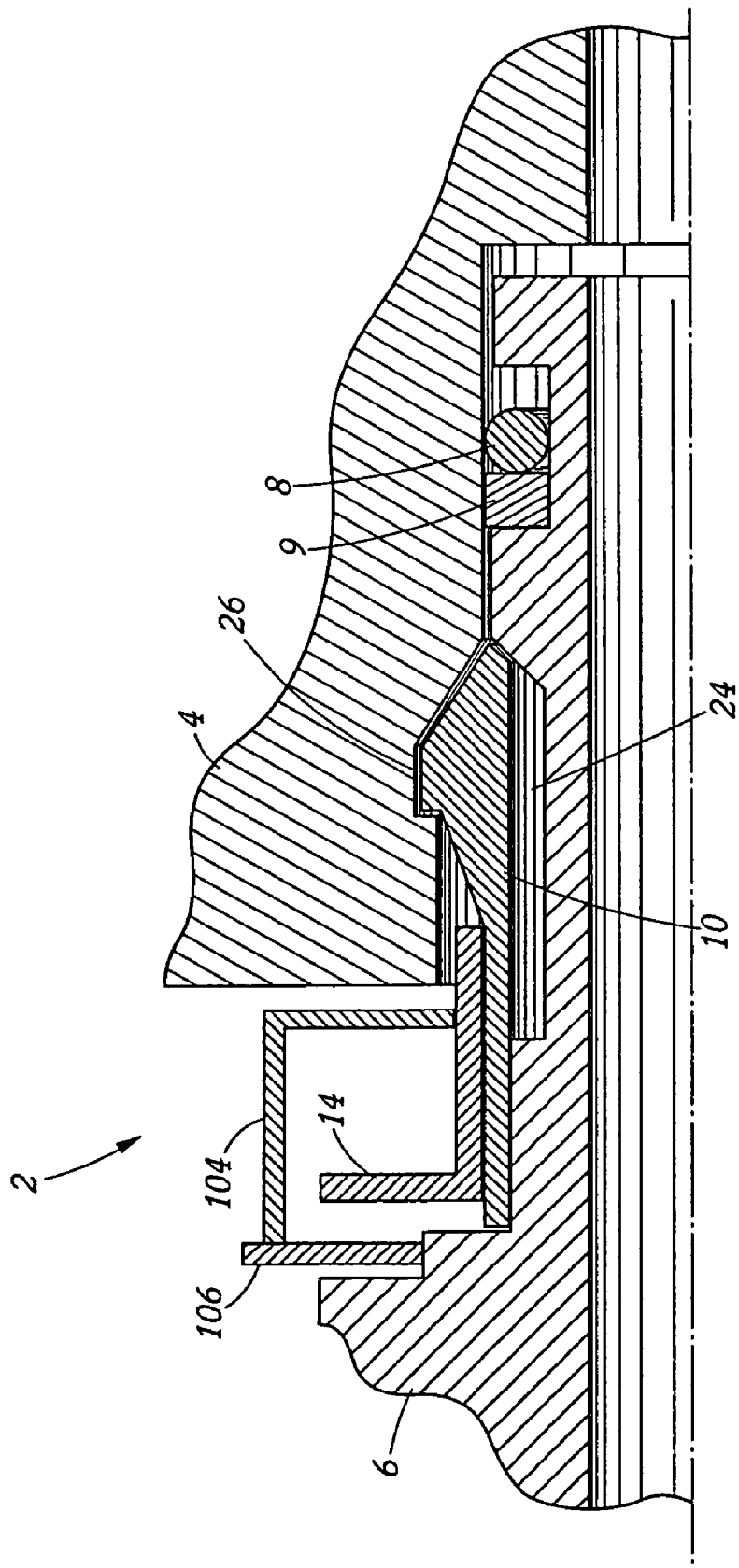
FIG. 62 is a partial cross-sectional front elevation view of an alternative embodiment of the present invention similar to that shown in FIG. 58.

Referring now to FIGS. 55-57, yet another embodiment of the present invention is shown that employs a cam 100 integrated around the male portion 6. This embodiment of the present invention includes a cam 100 that is generally a cylindrical member situated about the male portion 6 of the coupling 2 and that is operatively interconnected to the lock release mechanism 14. The cam 100 includes a cam track 102 that engages the lock release mechanism 14 such that rotation of the cam 100 interacts with the flange of the lock release mechanism 14 to transition it in and out of the coupling to facilitate disconnection. The cam 100 may be threadingly engaged onto the male portion 6 or may be freely rotatable.

Referring now to FIGS. 58-62, still yet another embodiment of the present invention is shown that employs a plurality of interconnected obstruction sleeves that substantially prevent contact with the lock release mechanism 14. This embodiment employs a small diameter obstruction sleeve 104 rotatably engaged within a larger diameter obstruction sleeve 106. These sleeves are situated about the lock release mechanism 14 wherein a selective rotation of the smaller obstruction sleeve 104 with respect to the larger obstruction sleeve 106 selectively provides a gap within the combination wherein the operator's finger, or other tool, may be inserted to engage the lock release mechanism 14. Rotation of the smaller obstruction sleeve 104 will block the recess that allows for access to the lock release mechanism 14. One skilled in the art will appreciate that any similar mechanism may be employed which resides between a lock release mechanism 14 and the male portion of the coupler 6 such that the operator hand, or a tool, is prevented from interacting with the lock release mechanism 14 until said obstruction is removed.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A quick connect coupling with a safety release mechanism, comprising:
   a male coupling having an insert;
   a female coupling having a receiver defined therein which is adapted to receive at least a portion of said insert;
   a locking cavity positioned in said female coupling;
   a resilient locking device operatively interconnected to said male coupling and positioned in opposing relation to said locking cavity, wherein upon insertion of said male coupling into said female coupling link at least a portion of said resilient locking device extends into at least a portion of said locking cavity to substantially prevent disengagement of said male coupling and said female coupling;
   a release mechanism interconnected to said male coupling and in operable engagement with said resilient locking device, said release mechanism capable of traveling between at least two positions wherein in a first locked position said release mechanism is withdrawn from said resilient locking device and in a second release position said release mechanism engages at least a portion of said locking device to release said locking device from said locking cavity to disengage said male coupling from said female coupling; and
   a spacer in operable engagement with said release mechanism and repositioned by rotating at least a portion of said spacer, wherein said release mechanism is incapable of traveling from said first locked position to said second release position without a repositioning of said spacer.

2. The quick connect coupling of claim 1, wherein said locking cavity comprises at least one angled surface in opposing relationship to said resilient locking device.

3. The quick connect coupling of claim 1, wherein said resilient locking device is a non-continuous, substantially circular metallic ring.

4. The quick connect coupling of claim 1, wherein said resilient locking device is positioned at least partially within a recess in said male coupling when the release mechanism is in said second release position.

5. The quick connect coupling of claim 1, further comprising at least one seal operably interconnected to at least one of said male coupling and said female coupling, wherein said male coupling and said female coupling are in sealing engagement when said insert is positioned within said receiver.

6. The quick connect coupling of claim 1, wherein said spacer is positioned between a portion of said release mechanism and said female coupling.

7. The quick connect coupling of claim 1, wherein said spacer further comprises a handle portion that is adapted for grasping by a user.

8. The quick connect coupling of claim 1, wherein said spacer is repositioned by removing said spacer from between said release mechanism and said female coupling.

9. The quick connect coupling of claim 1, wherein said release mechanism includes a first end for engaging said resilient locking device, a portion for engagement with at least one of a user's hand and a tool, each operably interconnected to a portion positioned around said male coupling.

10. The quick connect coupling of claim 9, wherein said release mechanism includes an area that prohibits movement of said release mechanism when the internal pressure of the coupling exceeds a predetermined level, said area being located proximate to at least one of said first end and said portion for engagement.

11. A quick connect coupling comprising:
a male coupling having an insert which is adapted for engagement with a receiver of a female coupling and including a resilient locking means which is operatively interconnected to said male coupling and positioned in opposing relationship to a locking cavity in said female coupling, the improvement comprising:
a release mechanism operatively interconnected to said male coupling and positioned in proximate relationship to said resilient locking means, wherein said release mechanism travels between a first locked position and a second release position, and wherein in said second release position said resilient locking means is at least partially withdrawn from said locking cavity; and
a safety mechanism comprising a cylinder which is selectively rotatable, said safety mechanism in operable engagement with said release mechanism, wherein said release mechanism is restricted from traveling between said first position and said second position without disengagement of said safety mechanism from said release mechanism.

12. The quick connect coupling of claim 11, wherein said resilient locking means comprises a snap ring.

13. The quick connect coupling of claim 11, wherein said release mechanism deflects said resilient locking means into a cavity located within said male coupling when said release mechanism is in said second release position.

14. The quick connect coupling of claim 11, further comprising at least one sealing ring in operable engagement with said male coupling and said female coupling to provide sealing engagement.

15. The quick connect coupling of claim 11, wherein said safety mechanism comprises a non-continuous ring that is selectively removable.

16. The quick connect coupling of claim 11, wherein said release mechanism includes a first end for engaging said resilient locking means, a portion for engagement with at least one of a user's hand and a tool, each operably interconnected to a portion positioned around said male coupling.

17. The quick connect coupling of claim 16, wherein said release mechanism includes an area that prohibits movement of said release mechanism when the internal pressure of the coupling exceeds a predetermined level, said area being located proximate to at least one of said first end and said portion for engagement.

18. A quick connect coupling with a release mechanism, comprising:
a male coupling with an insert;
a female coupling having a receiver adapted to receive at least a portion of said male coupling insert;
a locking cavity positioned in at least a portion of said female coupling;
a locking means operably interconnected to said male coupling and adapted for
engagement with said locking cavity when said insert is positioned in said receiver of said male coupling;
a release means operably interconnected to said male coupling which selectively engages said resilient locking means to disengage said male coupling from said female coupling, wherein said locking means is deflected in a receiving cavity in said male coupling to allow disengagement of said male coupling and the female coupling; and a safety means selectively rotatable to allow travel of said release means.

19. The quick connect coupling of claim 18, wherein said locking means of the male coupling includes an angled surface for engagement with said release mechanism.

20. The quick connect coupling of claim 18, wherein said release means includes a cylindrical sleeve operably interconnected to said male coupling.

21. The quick coupling of claim 18, wherein said safety means is operably positioned proximate to said release means and said release means is substantially incapable of deflecting said resilient locking means until said safety means is at least partially disengaged from said release means.

22. The quick connect coupling of claim 21, wherein said safety means comprises a non-continuous concentric ring which is adapted for selective interconnection to said male coupling.

23. The quick connect coupling of claim 21, wherein said safety means includes a handle portion adapted for engagement with a user's fingers.

24. The quick connect coupling of claim 21, wherein said safety means is comprised of at least one of a metal, a fiberglass, a teflon, a nylon, a leather and a plastic material.

25. The quick connect coupling of claim 18, wherein said release means includes a first end for engaging said locking means, a portion for engagement with at least one of a user's hand and a tool, each operably interconnected to a portion positioned around said male coupling.

26. The quick connect coupling of claim 25, wherein said release means includes an area that prohibits movement of said release means when the internal pressure of the coupling exceeds a predetermined level, said area being located proximate to at least one of said first end and said portion for engagement.

27. A method of providing a selectively severable fluid conduit, comprising:
providing a male coupling having an insert;
providing a female coupling having a locking cavity and a receiver defined therein that receives at least a portion of said insert;
operatively interconnecting a resilient locking device to said male coupling and positioning said resilient locking device in opposing relationship to said locking cavity when said male coupling is engaged in said female coupling;
providing a release mechanism; and
inserting said male coupling into said female coupling, wherein said resilient locking device extends into at least a portion of said locking cavity to substantially prevent disengagement of said male coupling and said female coupling, wherein disengagement of said male coupling from said female coupling comprises selectively rotating a safety mechanism to allow use of said release mechanism to engage at least a portion of said locking device to remove said locking device from said locking cavity.

28. The method of claim 27, further comprising pressurizing said fluid conduit to force a portion of at least one of said male coupling and said female coupling against said resilient locking device to substantially prevent disengagement of said male coupling and said female coupling if an internal pressure is above a predetermined level.

29. The method of claim 27, further comprising providing a tool for engagement with said release mechanism, said tool having a force-limiting means.

\* \* \* \* \*